United States Patent
Gokita

(10) Patent No.: US 11,144,236 B2
(45) Date of Patent: Oct. 12, 2021

(54) INFORMATION PROCESSING APPARATUS, INFORMATION PROCESSING METHOD, AND NON-TRANSITORY COMPUTER-READABLE STORAGE MEDIUM FOR STORING PROGRAM

(71) Applicant: FUJITSU LIMITED, Kawasaki (JP)

(72) Inventor: Shun Gokita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 109 days.

(21) Appl. No.: 16/509,498

(22) Filed: Jul. 12, 2019

(65) Prior Publication Data
US 2019/0339900 A1 Nov. 7, 2019

Related U.S. Application Data

(63) Continuation of application No. PCT/JP2017/046966, filed on Dec. 27, 2017.

(30) Foreign Application Priority Data

Jan. 19, 2017 (JP) .............................. JP2017-007523

(51) Int. Cl.
G06F 3/06 (2006.01)
G06F 16/22 (2019.01)

(52) U.S. Cl.
CPC ............ *G06F 3/0655* (2013.01); *G06F 3/062* (2013.01); *G06F 3/068* (2013.01); *G06F 16/2255* (2019.01)

(58) Field of Classification Search
None
See application file for complete search history.

(56) References Cited

U.S. PATENT DOCUMENTS 6,434,662 B1 * 8/2002 Greene ............... G06F 16/9014
711/108
7,600,094 B1 * 10/2009 Jin ....................... G06F 16/2255
711/216
(Continued)

FOREIGN PATENT DOCUMENTS

JP 4-101272 A 4/1992
JP 5-12337 A 1/1993
(Continued)

OTHER PUBLICATIONS

International Search Report and Written Opinion dated Mar. 27, 2018 for PCT/JP2017/046966 filed on Dec. 27, 2017, 11 pages including English Translation of the International Search Report and Written Opinion.

(Continued)

*Primary Examiner* — Kaushikkumar M Patel
(74) *Attorney, Agent, or Firm* — Xsensus LLP

(57) ABSTRACT

A method includes: executing a first process includes receiving an entry that includes a kay and a value, selecting a first list from among a plurality of lists in accordance with a first hash value, adding, to the selected first list, a first identifier in association with the received entry, and storing the received entry in any of a first memory device and a second memory device that is greater in latency than the first memory device; and executing a second process that includes receiving a searching request for a value, selecting the first list based on the first hash value derived from the searching key in the received searching request, obtaining the first identifier from the first list selected in the second process, obtaining the entry associated with the first identifier obtained in the second process, and outputting the value in the entry obtained in the second process.

18 Claims, 24 Drawing Sheets

(56) References Cited

U.S. PATENT DOCUMENTS

| | | | | |
|---|---|---|---|---|
| 2010/0217953 A1* | 8/2010 | Beaman | ............ | G06F 16/2255 |
| | | | | 711/216 |
| 2011/0246451 A1 | 10/2011 | Tatsumura et al. | | |
| 2012/0005419 A1* | 1/2012 | Wu | ................ | G06F 16/25 |
| | | | | 711/105 |
| 2016/0077980 A1* | 3/2016 | Tomlin | ................ | G06F 16/20 |
| | | | | 711/135 |
| 2016/0099810 A1* | 4/2016 | Li | ................ | G11C 15/00 |
| | | | | 713/193 |
| 2017/0212680 A1* | 7/2017 | Waghulde | ............ | G06F 16/185 |

FOREIGN PATENT DOCUMENTS

| | | |
|---|---|---|
| JP | 7-64801 A | 3/1995 |
| JP | 2011-170597 A | 9/2011 |
| JP | 2011-215835 A | 10/2011 |

OTHER PUBLICATIONS

Japanese Office Action dated Aug. 18, 2020, issued in corresponding Japanese Patent Application No. 2017-007523.

* cited by examiner

INFORMATION PROCESSING APPARATUS, INFORMATION PROCESSING METHOD, AND NON-TRANSITORY COMPUTER-READABLE STORAGE MEDIUM FOR STORING PROGRAM

CROSS-REFERENCE TO RELATED APPLICATIONS

This application is a continuation application of International Application PCT/JP2017/046966, filed on Dec. 27, 2017 and designated the U.S., the entire contents of which are incorporated herein by reference. The International Application PCT/JP2017/046966 is based upon and claims the benefit of priority of the prior Japanese Patent Application No. 2017-007523, filed on Jan. 19, 2017, the entire contents of each are incorporated herein by reference.

FIELD

The embodiments discussed herein are related to a technology of storing data using a plurality of types of memory devices.

BACKGROUND

A volume of data handled by the latest application becomes greater. However, an apparatus provided with a dynamic random access memory (DRAM) for storing mass data is expensive. In addition to the DRAM, an apparatus using a relatively inexpensive memory device may be considered. However, such a memory device has a large latency.

In addition, a hash table is commonly used in the apparatus for storing the mass data. However, in a case of using the hash table, the same hash values are generated from different keys and a desired value may not be specified only by the hash value in some cases. Such a state is called to a collision in the hash table.

If mass management data is stored in the DRAM to cope with the collision, a DRAM space allocated to the data to be originally saved becomes smaller, and access performance is degraded. On the other hand, if the number of times to access an inexpensive memory device to cope with the collision increases, a searching process for data related to the collision becomes delayed.

Examples of the related art include Japanese Laid-open Patent Publication Nos. 05-12337 and 04-101272.

SUMMARY

According to an aspect of the embodiments, a method for information processing, the method includes: executing a first process includes receiving an entry that includes a kay and a value, selecting a first list from among a plurality of lists in accordance with a first hash value, the first hash value being derived from the key included in the received entry, each of the plurality of lists being associated with a hash value, adding, to the selected first list, a first identifier in association with the received entry, the first identifier corresponding to the key included in the received entry, and storing the received entry in any of a first memory device and a second memory device, the second memory device being greater in latency than the first memory device; and executing a second process that includes receiving a searching request for a value, the searching request includes a searching key, selecting the first list from among the plurality of lists in accordance with the first hash value derived from the searching key included in the received searching request, obtaining the first identifier from the first list selected in the second process, the first identifier corresponding to the searching key, obtaining the entry associated with the first identifier obtained in the second process, and outputting the value included in the entry obtained in the second process.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

An object of the embodiment is, in one aspect, to quickly handle with a collision in a hash table in an apparatus that stores data using a plurality of types of memory devices.

Embodiment 1

Figure 1:
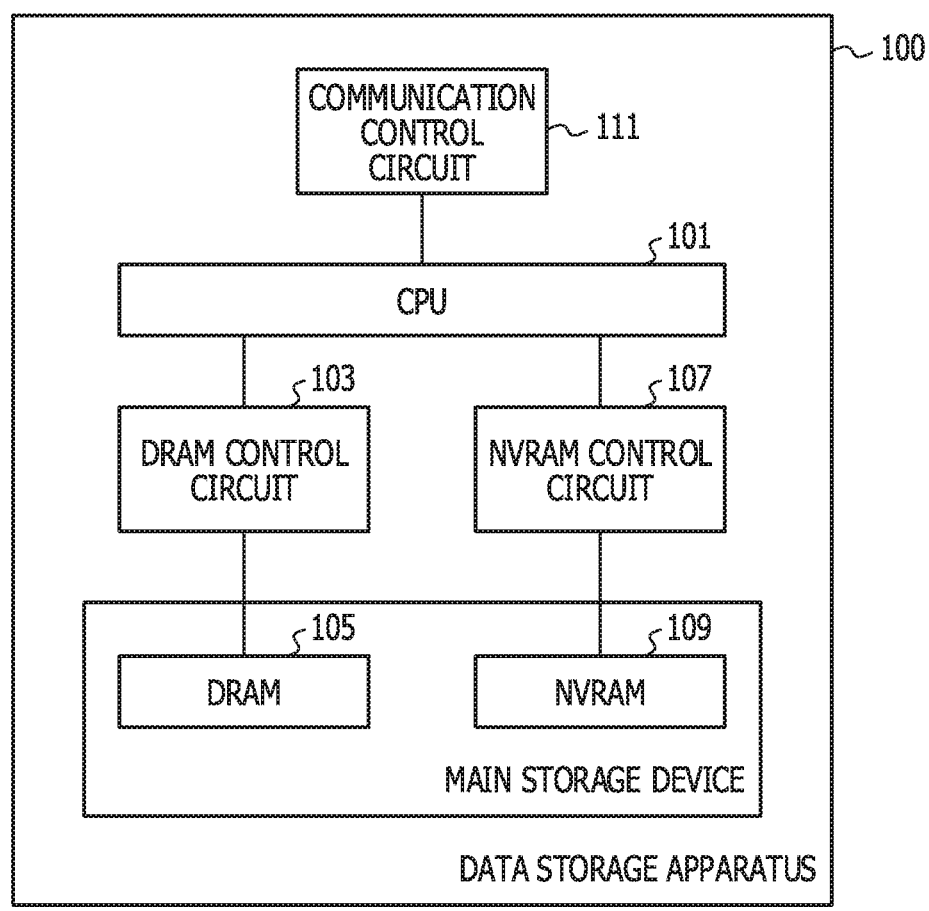
FIG. 1 is a diagram illustrating a hardware configuration example of a data storage device.

FIG. 1 is a diagram illustrating a hardware configuration example of a data storage device 100. A central processing unit (CPU) 101 is connected to a DRAM control circuit 103, a non-volatile random access memory (NVRAM) control circuit 107, and a communication control circuit 111. The DRAM control circuit 103 is connected to a DRAM 105. The DRAM control circuit 103 controls the DRAM 105. The NVRAM control circuit 107 is connected to a NVRAM 109. The NVRAM control circuit 107 controls the NVRAM 109. The DRAM 105 and the NVRAM 109 are used as a main storage device. The communication control circuit 111 controls network communication. The NVRAM 109 has a larger latency than the DRAM 105. The NVRAM 109 is, for example, a phase change memory (PCM), a resistive random access memory (ReRAM), or a magnetoresistive random access memory (MRAM).

Figure 2:
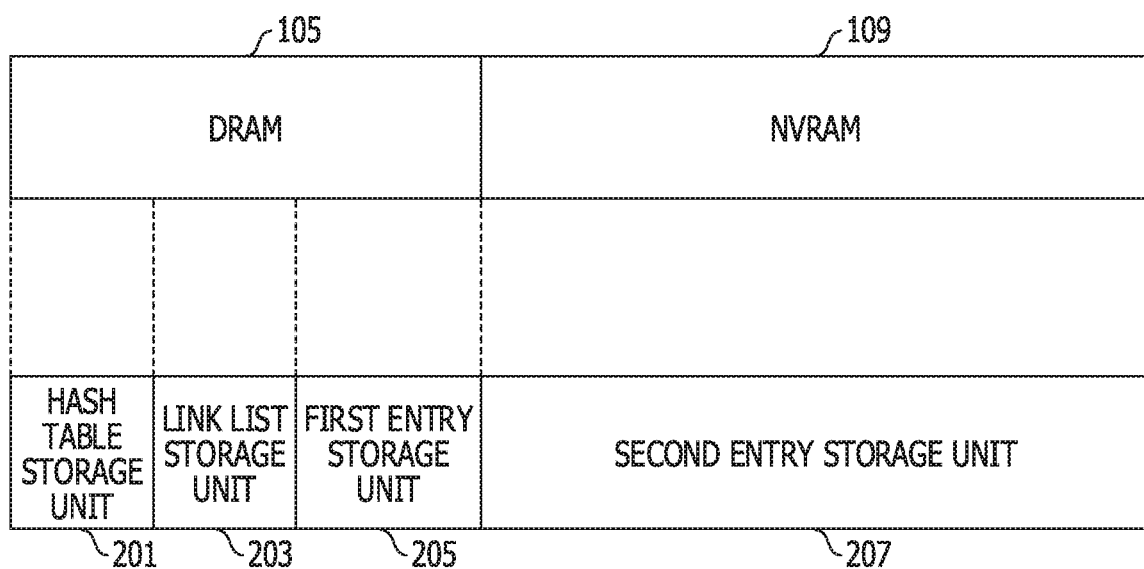
FIG. 2 is a diagram illustrating an example of allocation of a storage unit to a memory device.

FIG. 2 is a diagram illustrating an example of allocation of storage units to memory devices. A hash table storage unit 201, a link list storage unit 203, and a first entry storage unit 205 are allocated to the DRAM 105. A second entry storage unit 207 is assigned to the NVRAM 109.

A hash table stored in the hash table storage unit 201 is management data used to improve searching performance by a program that registers pairs of keys and values and searches for values based on searching keys. A set of a key a value may be called an entry.

The hash table uses a hash value calculated based on the key. Specifically, the hash table is an array indexed by the hash value. An array element is link data that specifies the lead node of the link list. The link list will be described later.

A hash function that calculates the hash value may output the same hash value even in a case of having the different input keys. In the hash table, a key that is an origin having the same hash value is called a cognate key. For example, if the hash value calculated based on a first key and the hash value calculated based on a second key different from the first key have the same value, the first key is in the relation of the second key and the "cognate key".

The link list storage unit 203 stores a list that is associated with entries related to the cognate keys. The list in this example is in the form of a linked list format. The linked list is called a connection list in some cases. The linked list is a series of nodes. In this example, the node corresponds to each of the cognate keys.

The first entry storage unit 205 stores the entry allocated with the DRAM 105 in a record format. In addition, the second entry storage unit 207 also stores the entry allocated with the NVRAM 109 in the record format.

The present embodiment relates to a mechanism for resolving a collision regarding a hash value (in this example, the first hash value) in the hash table in the data storage device 100 using the DRAM 105 and the NVRAM 109 in combination. For example, the data structure in the chaining method that resolves collisions is focused.

Figure 3A:
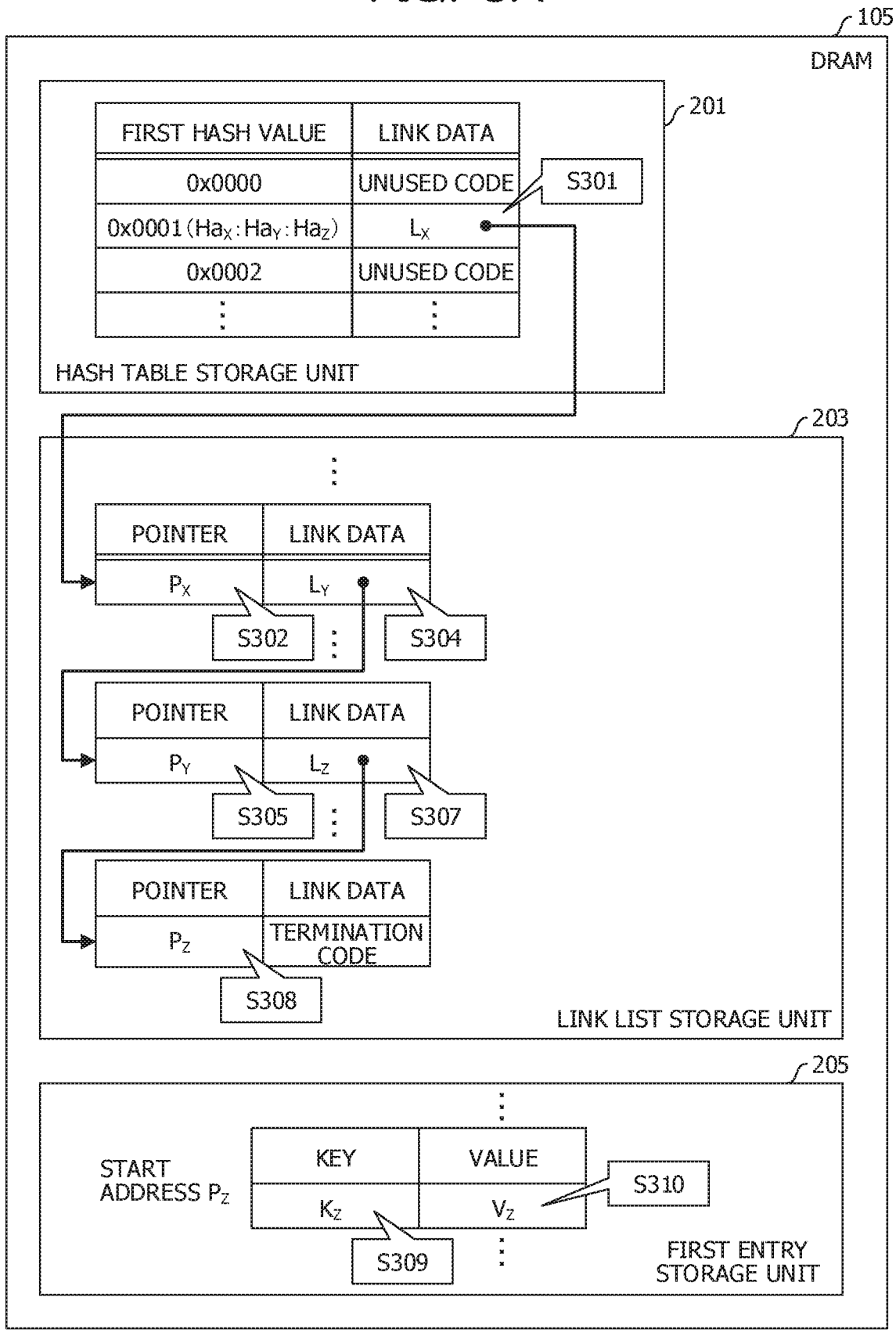
FIG. 3A is a diagram illustrating a first reference example of a data configuration.
Figure 3B:
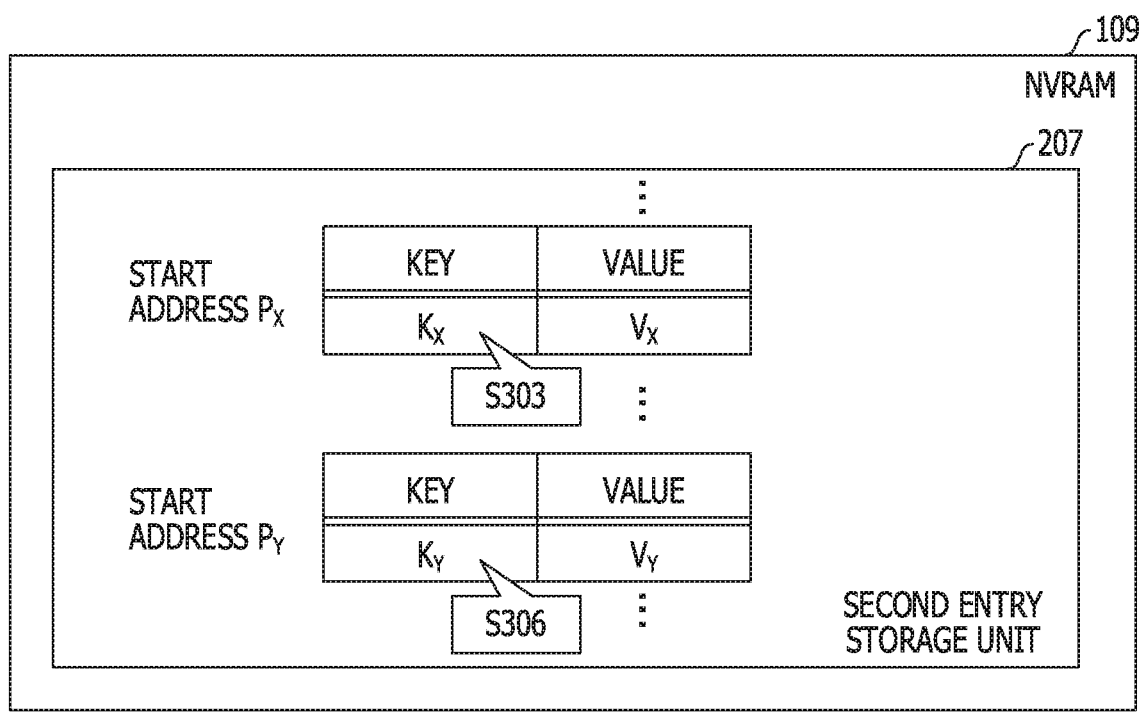
FIG. 3B is a diagram illustrating the first reference example of the data configuration.

Before describing the present embodiment, two reference examples will be described. In a first reference example, the entry is stored as one of the first entry storage unit 205 and the second entry storage unit 207 (hereinafter, referred to as an entry record). FIG. 3A and FIG. 3B are diagrams illustrating a first reference example of the data configuration.

First, the configuration of the hash table will be described. The hash table in this example includes a record corresponding to the sequential first hash value. The hash table includes a field where the first hash value is stored, and a field for setting link data.

The first hash value is an index of the array. The link data specifies a lead node of the link list. The link data is, for example, an address of the lead node or an ID of the lead node. In a case where the link list is not provided yet, an unused code is set in the field for the link data.

In this example, a first hash value $H_{aX}$ based on a key X, a first hash value $H_{aY}$ based on a key Y, and a first hash value $H_{aZ}$ based on a key Z are all 0x0001. For example, the key X, the key Y, and the key Z are cognate keys. In addition, the link data to the lead node of the link list related to the cognate key is $L_X$. For example, $L_X$ specifies a first node illustrated in the link list storage unit 203.

Subsequently, the configuration of the link list will be described. A link list is provided for each cognate key. In the linked list, nodes having the same numbers as that of the cognate key are connected. The node has a field for setting a pointer and a field for setting link data.

The pointer points to a start address of the entry record including the cognate key. The link data identifies the next node. The link data is, for example, the address of the next node or the ID of the next node. In the case of the last node, a termination code is set in the field of link data.

The illustrated first node corresponds to a key $K_X$. In the field of the pointer in this node, a pointer $P_X$ pointing to the start address of the entry record including the key $K_X$ and the value $V_X$ is set. In addition, in this node, link data $L_Y$ specifying the second node is set.

The illustrated second node corresponds to a key $K_Y$. In the field of the pointer in this node, a pointer $P_Y$ pointing to the start address of the entry record including the key $K_Y$ and the value $V_Y$ is set. In addition, in this node, link data $L_Z$ specifying a third node is set.

The illustrated third node corresponds to a key $K_Z$. In the field of the pointer in this node, a pointer $P_Z$ pointing to the start address of the entry record including the key $K_Z$ and a value $V_Z$ is set. In addition, since this node is a terminal, a terminal code is set in the link data field.

The first entry storage unit 205 and the second entry storage unit 207 store entries including the key and the value.

Subsequently, an operation when the searching key included in the searching request is the $K_Z$ will be described. First, a link data $L_X$ corresponding to the hash value $H_{aZ}$ (0x0001) of the searching key $K_Z$ is read (S301). Further, the pointer $P_X$ set to the first node specified by the link data $L_X$ is read (S302). The key $K_X$ set in the entry record of the second entry storage unit 207 specified by the pointer $P_X$ is read (3303). Since the read key $K_X$ does not match the searching key $K_Z$, the entry record is not a reference target.

Therefore, the link data $L_Y$ set in the first node is read (S304). Further, the pointer $P_Y$ set to the second node specified by the link data $L_Y$ is read (3305). The key $K_Y$ set in the entry record of the second entry storage unit 207 specified by the pointer $P_Y$ is read (S306). Since the read key $K_y$ does not match the searching key $K_Z$, the entry record is not a reference target.

Therefore, the link data $L_Z$ set in the second node is read (S307). Further, the pointer $P_Z$ set to the third node specified by the link data $L_Z$ is read (S308). The key $K_Z$ set in the entry record of the first entry storage unit 205 specified by the pointer $P_Z$ is read (S309). Since the read key $K_Z$ matches the searching key $K_Z$, the entry record is a reference target.

In this case, the value $V_Z$ set in the entry record is read (3310). This value $V_Z$ is a searching result.

In this example, the cognate keys are distributed to the first entry storage unit 205 and the second entry storage unit 207. Therefore, in the process of searching for the entry record including the searching key, the key is read from the NVRAM 109 as depicted in S303 and S306. As a result, a processing speed of the searching related to the cognate key may be slow.

Figure 4A:
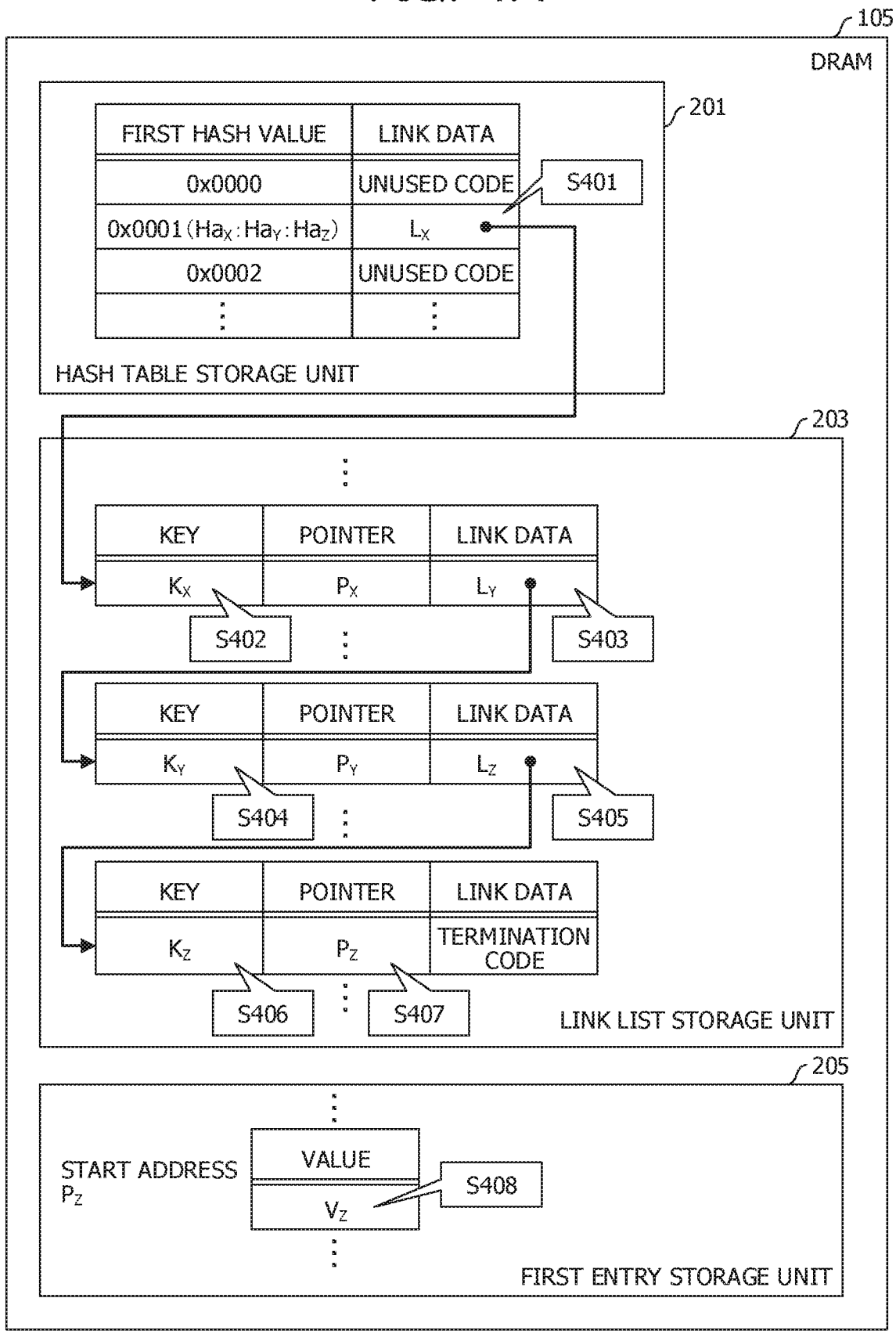
FIG. 4A is a diagram illustrating a second reference example of the data configuration.
Figure 4B:
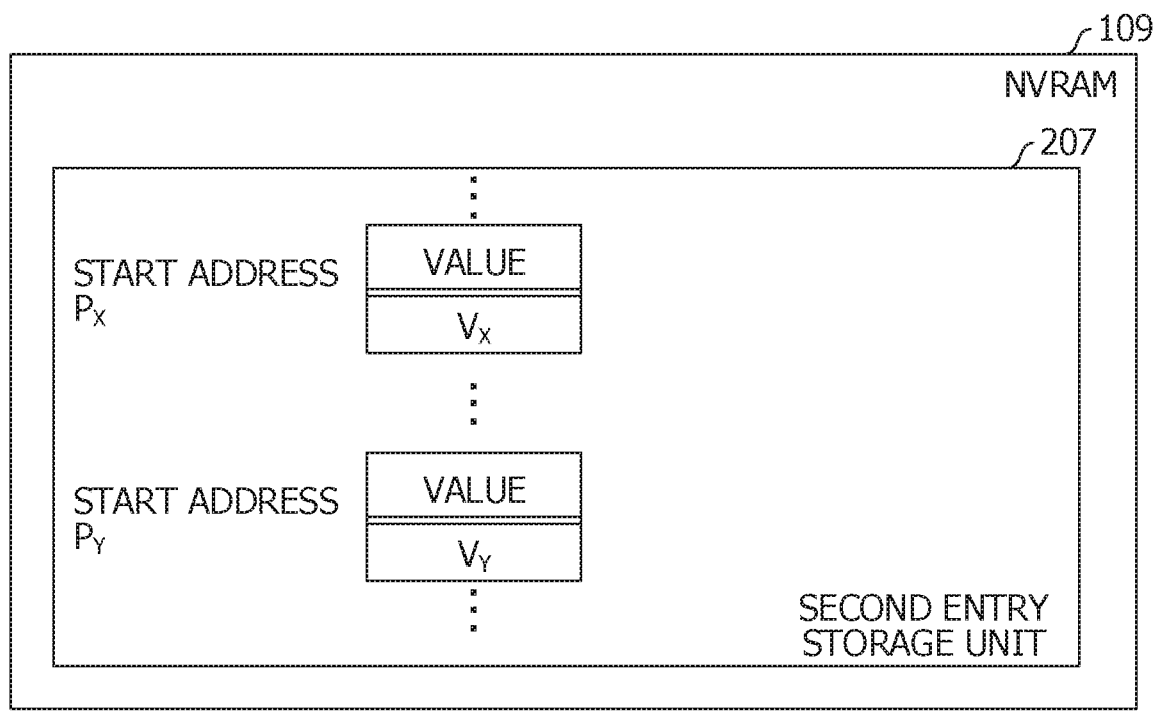
FIG. 4B is a diagram illustrating the second reference example of the data configuration.

Subsequently, a second reference example will be described. FIGS. 4A and 4B illustrate a second reference example of the data configuration. In the second reference example, a field for setting a key in an entry record is omitted. On the other hand, a field for setting the key is provided in the node.

The configuration of the hash table in the second reference example is the same as in the case of the first reference example.

The configuration of the link list in the second reference example will be described. The node includes a field for setting the key, in addition to the field for setting the pointer and the field for setting the link data. The key set in this field corresponds to the cognate key.

The key $K_X$ is set to the illustrated first node. Similarly, the key $K_Y$ is set to the second node. Similarly, the key $K_Z$ is set to the third node.

Subsequently, an operation when the searching key included in the searching request is $K_Z$ will be described. First, the link data $L_X$ corresponding to the hash value $H_{aZ}$ (0x0001) of the searching key $K_Z$ is read (S401). Further, the key $K_X$ set in the first node specified by the link data $L_X$ is read (S402). Since the read key $K_X$ does not match the searching key $K_Z$, the node is irrelevant to the reference target.

Therefore, the link data $L_Y$ set in the first node is read (S403). Further, the key $K_Y$ set to the second node specified by the link data $L_Y$ is read (S404). Since the read key $K_Y$ does not match the searching key $K_Z$, the node is irrelevant to the reference target.

Therefore, the link data $L_Z$ set in the second node is read (S405). Further, the key $K_Z$ set to the third node specified by the link data $L_Z$ is read (S406). Since the read key $K_Z$ matches the searching key $K_Z$, the entry record is a reference target.

In this case, the pointer $P_Z$ set in the third node is read (S407). The value $V_Z$ set in the entry record of the first entry storage unit 205 specified by the pointer $P_Z$ is read (S408). The value $V_Z$ is the searching result.

In this example, the cognate keys are concentrated in the link list storage unit 203. Therefore, in the process of searching for the entry records including the searching key, there is no desire to access the second entry storage unit 207. As a result, the processing speed of the searching related to the cognate key is increased. However, since the field of the node is increased, the space of the link list storage unit 203 is increased. Along with this, a space of the first entry storage unit 205 becomes smaller. Therefore, since a proportion of the values stored in the DRAM 105 is reduced, there is a problem that the number of cases that may not be searched at a high speed increases.

Figure 5A:
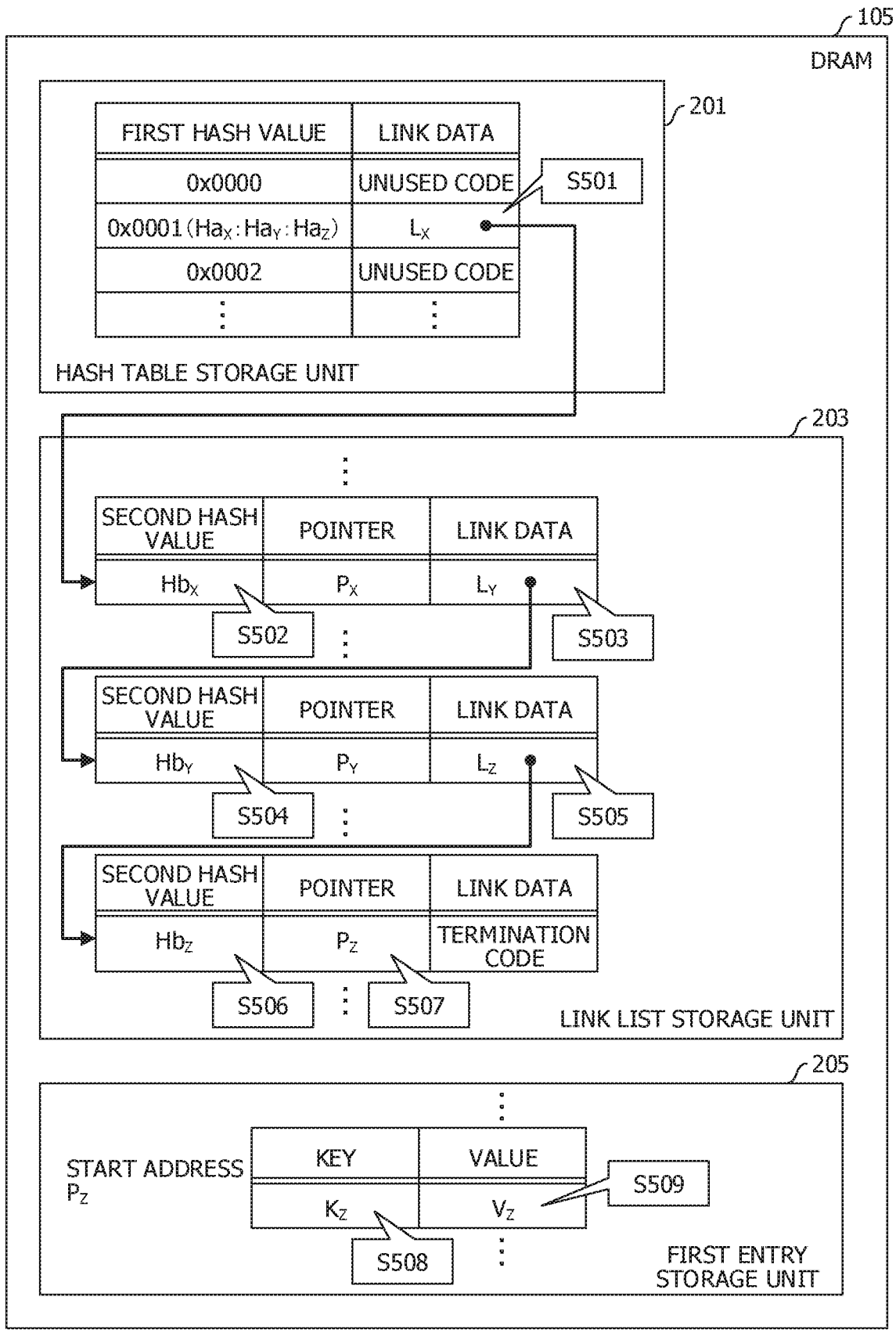
FIG. 5A is a diagram illustrating the data configuration in Embodiment 1.
Figure 5B:
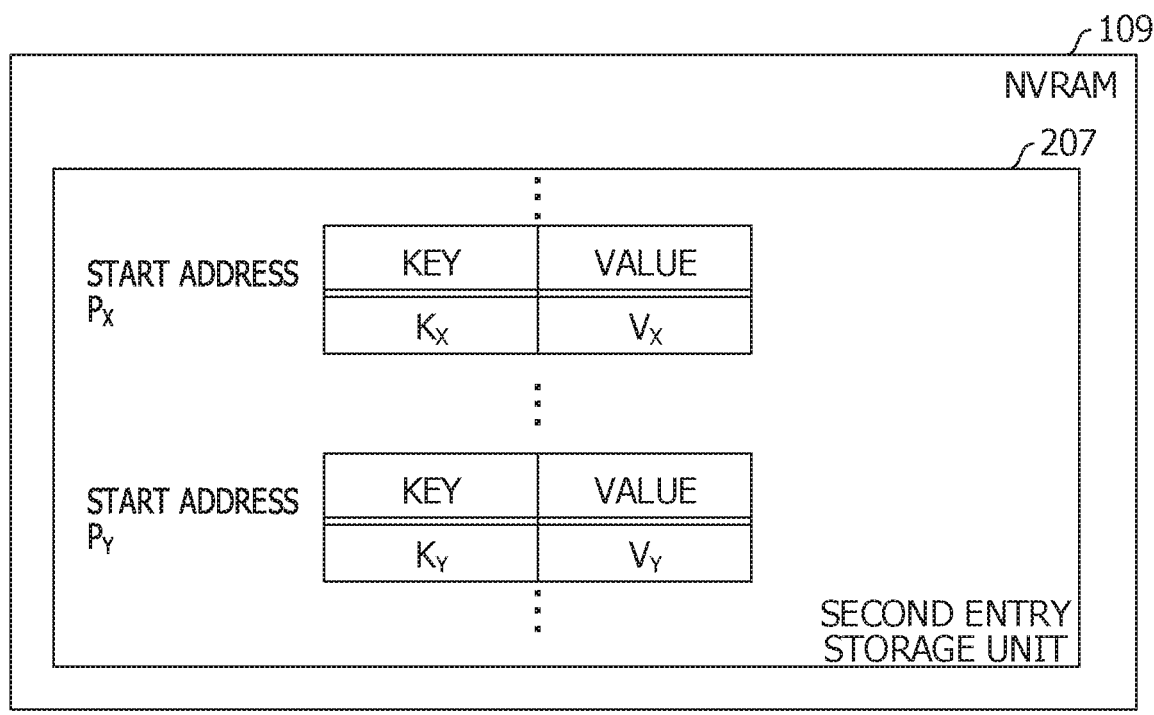
FIG. 5B is a diagram illustrating the data configuration in Embodiment 1.

FIG. 5A and FIG. 5B are diagrams illustrating a data configuration in the present embodiment. In the present embodiment, the entry record is same as in the case of the first reference example. On the other hand, the node is provided with a field for setting a second hash value instead of the field for setting the key in the second reference example. The second hash value is calculated based on the key in the same manner as the first hash value. However, the second hash value is calculated by a hash function different from the hash function that calculates the first hash value.

The configuration of the hash table in the present embodiment is the same as in the case of the first reference example.

The configuration of the link list in the present embodiment will be described. The node has a field for setting the second hash value, in addition to the field for setting the pointer and the field for setting the link data.

A second hash value $Hb_X$ based on the key $K_X$ is set to the illustrated first node. Similarly, a second hash value $Hb_Y$ based on the key $K_Y$ is set to the second node. Similarly, the second hash value $Hb_Z$ based on the key $K_Z$ is set to the third node.

The configurations of the first entry storage unit 205 and the second entry storage unit 207 in the present embodiment are the same as in the case of the first reference example.

Subsequently, an operation when the searching key included in the searching request is $K_Z$ will be described. First, the link data $L_X$ corresponding to the hash value $Ha_Z$ (0x0001) of the searching key $K_Z$ is read (S501). Further, the second hash value $Hb_X$ set in the first node specified by the link data $L_X$ is read (S502). Since the read second hash value $Hb_X$ does not match the second hash value $Hb_Z$ of the searching key $K_Z$, the node is irrelevant to the reference target.

Therefore, the link data $L_Y$ set in the first node is read (S503). Further, the second hash value $Hb_Y$ set in the second node specified by the link data $L_Y$ is read (3504). Since the read second hash value $Hb_Y$ does not match the second hash value $Hb_Z$ of the searching key $K_Z$, the node is irrelevant to the reference target.

Therefore, the link data $L_Z$ set in the second node is read (S505). Further, the second hash value $Hb_Z$ set in the third node specified by the link data $L_Z$ is read (S506). Since the read second hash value $Hb_Z$ matches the second hash value $Hb_Z$ of the searching key $K_Z$, the entry record corresponding to the node is a reference target candidate.

In this case, the pointer $P_Z$ set in the third node is read (S507). The key $K_Z$ set in the entry record of the first entry storage unit 205 specified by the pointer $P_Z$ is read (S508). Since the read key $K_Z$ matches the searching key $K_Z$, the entry record is the reference target. The value $V_Z$ set in the entry record of the first entry storage unit 205 specified by the pointer $P_Z$ is read (S509). The value $V_Z$ is the searching result.

Since the size of the second hash value is smaller than the size of the key, the space of the link list storage unit 203 in the present embodiment is smaller than that of the second reference example, Therefore, the problem of the second reference example is solved that the space of the first entry storage unit 205 is not so compressed and the number of cases where the searching is not performed at high speed increases.

Further, in the process of searching for the entry record, since there is little opportunity to read the key from the second entry storage unit 207, the processing speed of the searching relating to the cognate key does not become very slow. This is the end of the description of an outline in the present embodiment.

Figure 6:
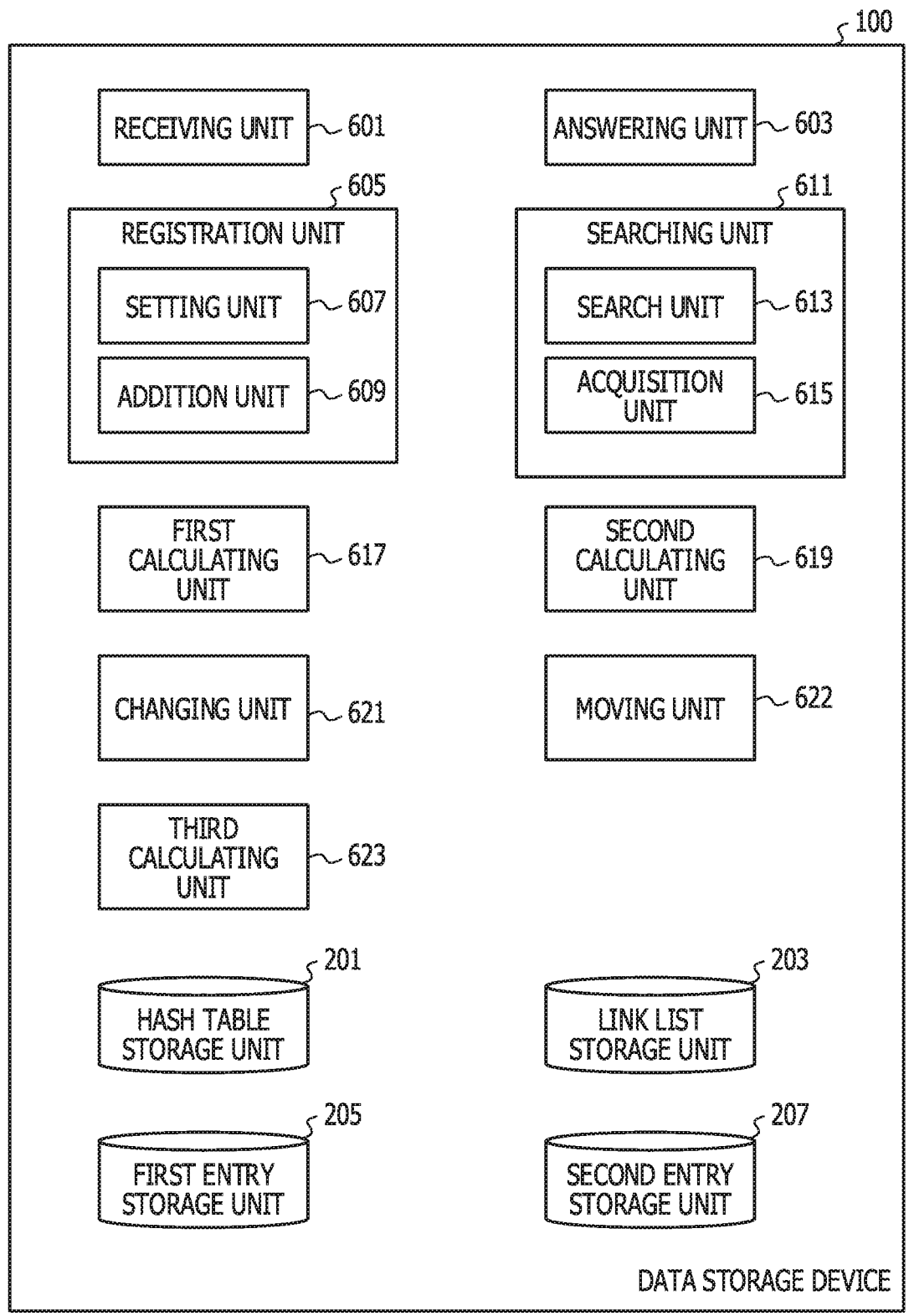
FIG. 6 is a diagram illustrating a module configuration example of the data storage device.

Hereinafter, the operation of the data storage device 100 will be described. FIG. 6 illustrates a module configuration example of the data storage device 100. The data storage device 100 includes a receiving unit 601, an answering unit 603, a registration unit 605, a searching unit 611, a first calculating unit 617, a second calculating unit 619, a changing unit 621, a moving unit 622, a third calculating unit 623, the hash table storage unit 201, the link list storage unit 203, the first entry storage unit 205, and the second entry storage unit 207.

The receiving unit 601 receives a registration request or a searching request from a client. The answering unit 603 answers the processing result or the searched value to the client.

The registration unit 605 registers a new entry based on the registration request. The registration unit 605 includes a setting unit 607 and an addition unit 609. The setting unit 607 sets a new entry record. The addition unit 609 adds a node corresponding to the new entry record.

The searching unit 611 searches for a value based on the searching request. The searching unit 611 includes a search unit 613 and an acquisition unit 615. The search unit 613 searches for an entry record that includes a key that matches the searching key. The acquisition unit 615 acquires a value from the searched entry record.

The first calculating unit 617 calculates a first hash value. The second calculating unit 619 calculates the second hash value. The changing unit 621 changes the order of the nodes included in the link list in Embodiment 2. The moving unit 622 moves the entry record in Embodiment 3. The third calculating unit 623 calculates a third hash value in Embodiment 4.

As described above, the hash table storage unit 201 stores the hash table. The link list storage unit 203 stores a link list. The first entry storage unit 205 stores an entry record assigned to the DRAM 105. The second entry storage unit 207 stores the entry record assigned to the NVRAM 109.

The receiving unit 601, the answering unit 603, the registration unit 605, the setting unit 607, the addition unit 609, the searching unit 611, the search unit 613, the acquisition unit 615, the first calculating unit 617, the second calculating unit 619, the changing unit 621, the moving unit 622, and the third calculating unit 623 described above are realized using hardware resources (for example, FIGS. 1 and 18) and a program that causes the processor to execute processes described below.

Figure 18:
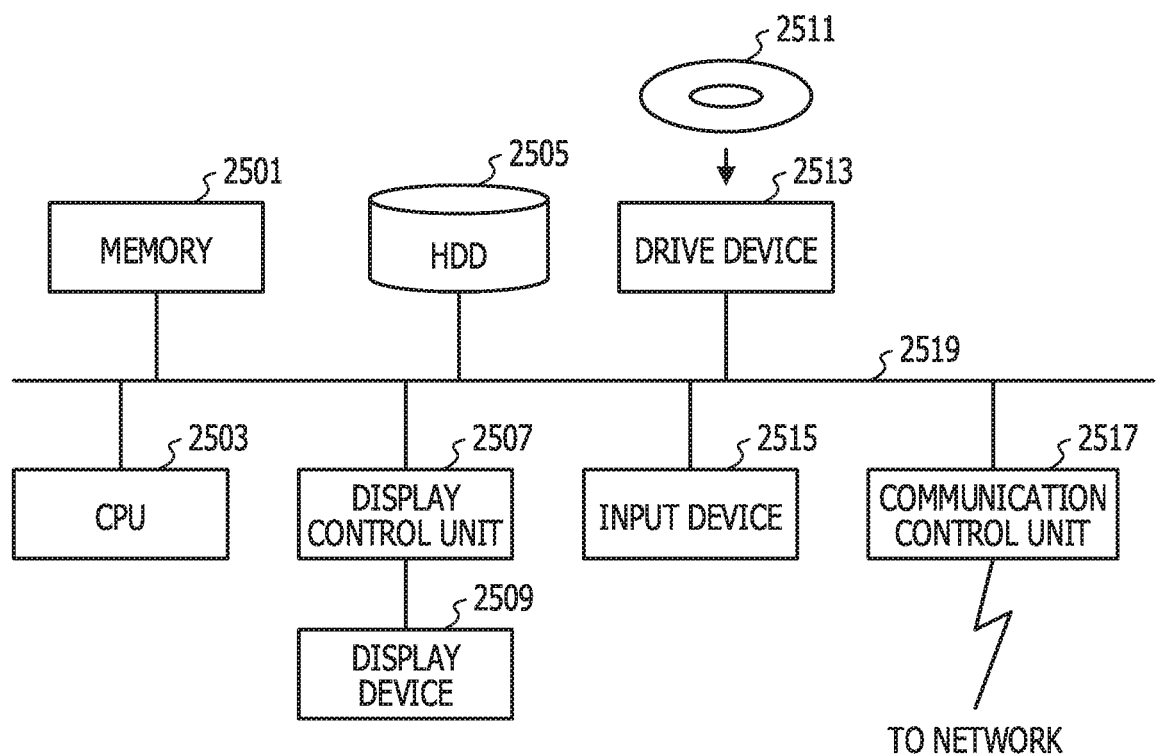
FIG. 18 is a functional block diagram of a computer.

The hash table storage unit 201, the link list storage unit 203, the first entry storage unit 205, and the second entry storage unit 207 described above are realized using the hardware resources (for example, FIGS. 1 and 18).

Figure 7:
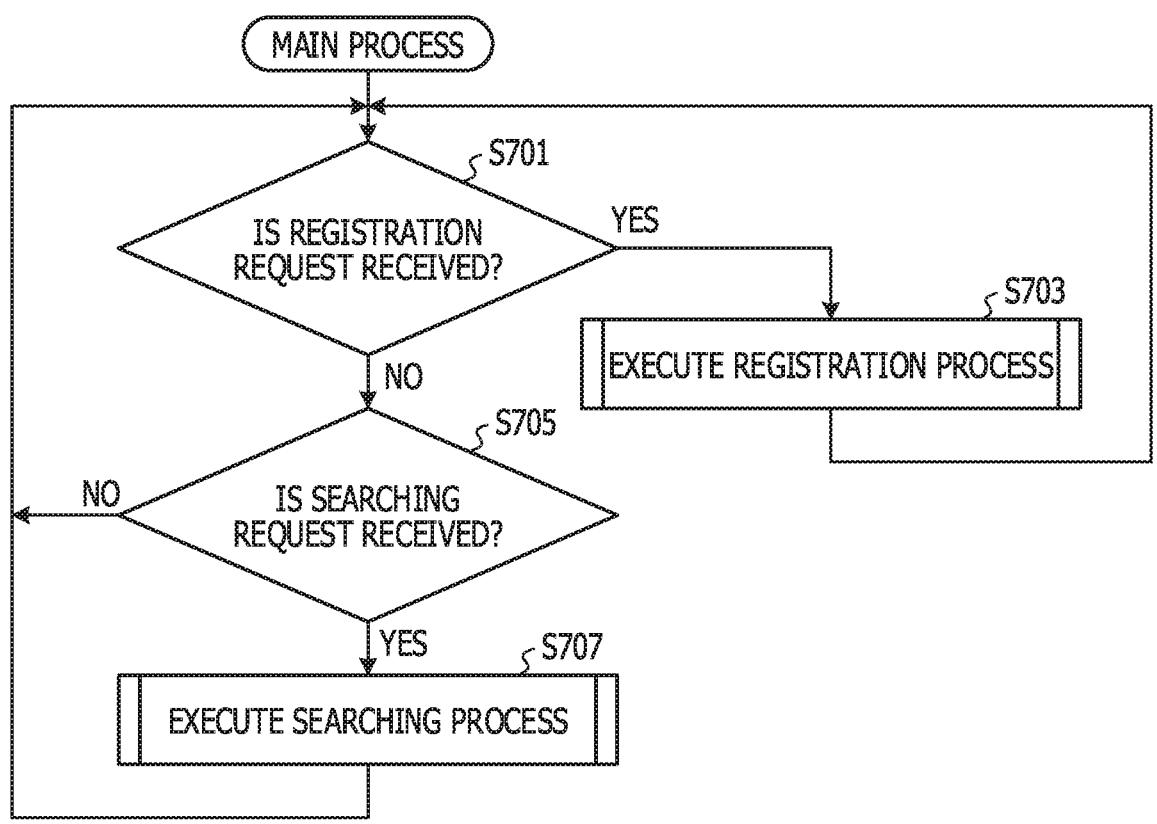
FIG. 7 is a diagram illustrating a main process flow.

Subsequently, a process in the data storage device 100 will be described. FIG. 7 is a diagram illustrating a main process flow. The data storage device 100 receives the request from the client. The client is, for example, a device other than the data storage device 100. However, the client may be software included in the data storage device 100.

The receiving unit 601 determines whether a registration request received from the client (S701). The registration request is issued when a client requests registration of an entry. The registration request includes a set of the key and the value, for example, an entry to be registered.

In a case where it is determined that the registration request is received from the client, the registration unit 605 executes a registration process (S703). In the registration process, the received entry is registered. The registration process will be described later with reference to FIGS. 8 to 10. When the registration process is ended, the process returns to the process depicted in S701, and the above-described processes are repeated.

On the other hand, when it is determined that the registration request is not received from the client, the receiving unit 601 determines whether the searching request is received (S705). The searching request is issued when the client acquires the value corresponding to the searching key. The searching request includes the searching key. In a case where it is determined that the searching request is not received from the client, the process returns to the process depicted in S701, and the above-described processes are repeated.

In a case where it is determined that a searching request is received from the client, the searching unit 611 executes a searching process (S707). In the searching process, the value is searched based on the searching key. The searching process will be described later with reference to FIGS. 11A and 11B.

Figure 8:
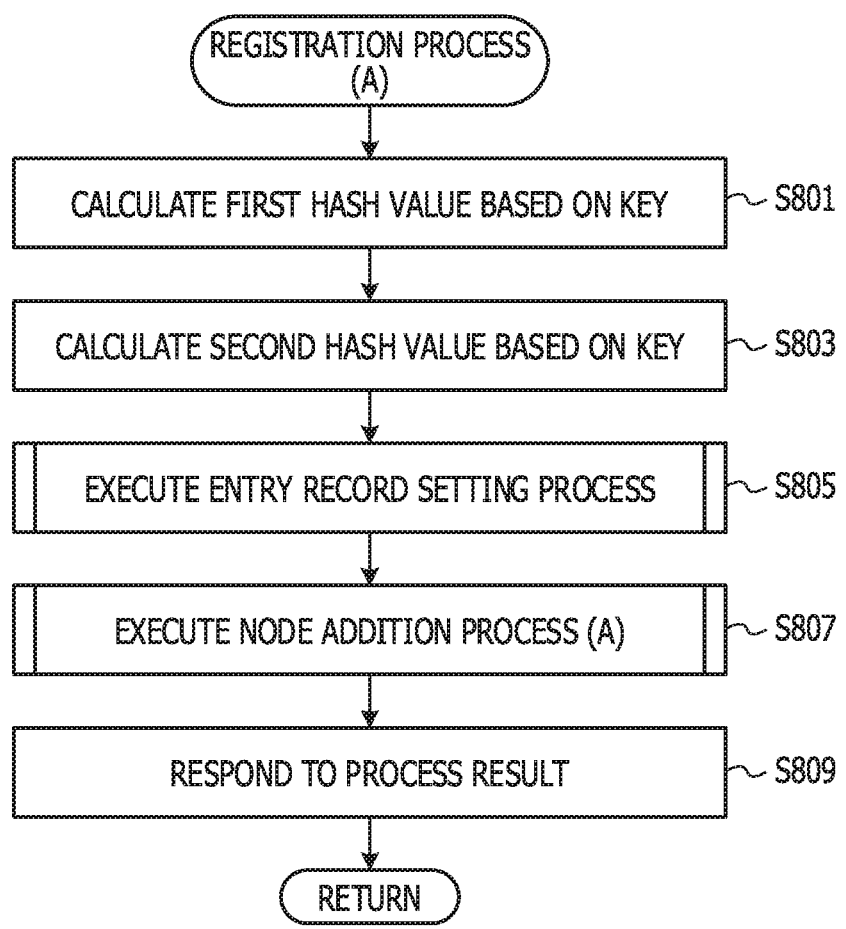
FIG. 8 is a diagram illustrating a flow of a registration process (A)

In the present embodiment, a registration process (A) is executed in S703. FIG. 8 is a diagram illustrating a flow of the registration process (A). The first calculating unit 617 calculates a first hash value based on the key included in the registration request (S801). The second calculating unit 619 calculates the second hash value based on the key included in the registration request (S803).

The setting unit 607 executes an entry record setting process (S805). In the entry record setting process, a new entry record is set in the first entry storage unit 205 or the second entry storage unit 207.

Figure 9:
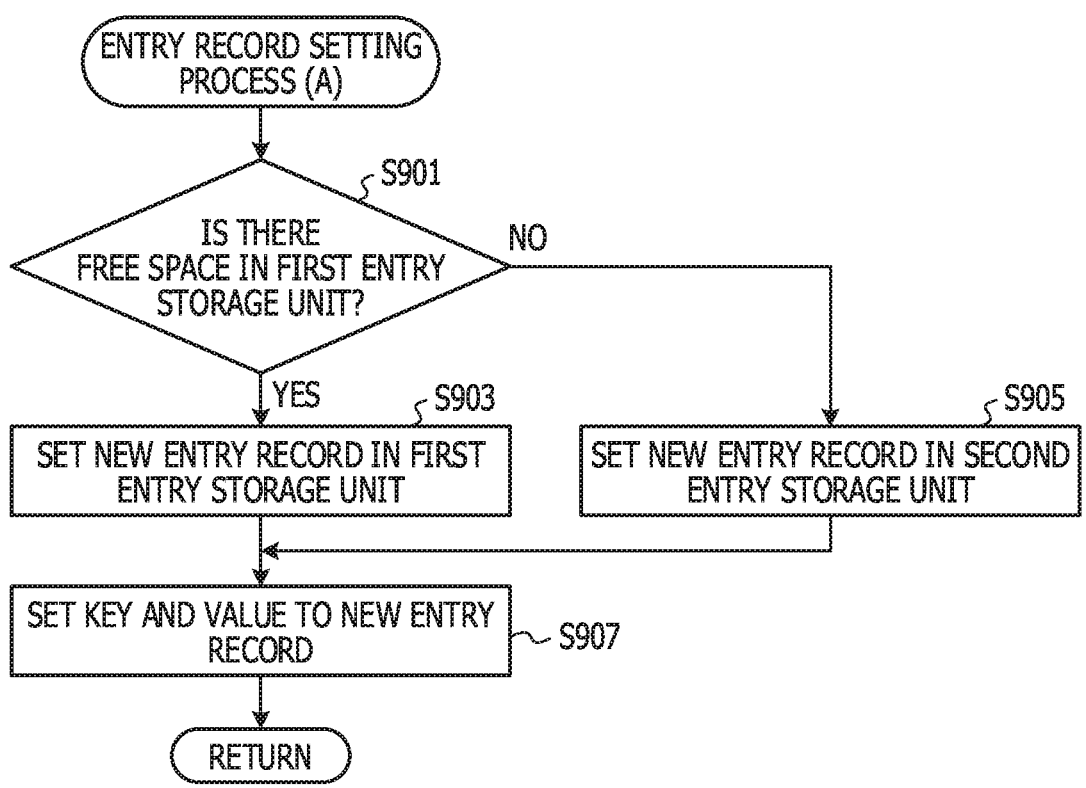
FIG. 9 is a diagram illustrating a flow example of an entry record setting process (A)

In the present embodiment, an entry record setting process (A) is executed. FIG. 9 is a diagram illustrating a flow example of an entry record setting process (A). The setting unit 607 determines whether there is a free space for providing a new entry record in the first entry storage unit 205 (S901). In a case where it is determined that there is a free space for providing a new entry record in the first entry storage unit 205, the setting unit 607 provides a new entry record in the first entry storage unit 205 (S903).

On the other hand, if it is determined that there is no free space for providing the new entry record in the first entry storage unit 205, the setting unit 607 provides a new entry record in the second entry storage unit 207 (S905).

The setting unit 607 sets the key and the value included in the registration request in the new entry record (S907). When the entry record setting process (A) is ended, the process returns to the registration process (A) of a caller.

It returns to the illustration of FIG. 8. Next, the addition unit 609 executes a node addition process (A) (S807). In the node adding process (A), a node corresponding to a new entry record is added to the link list.

Figure 10:
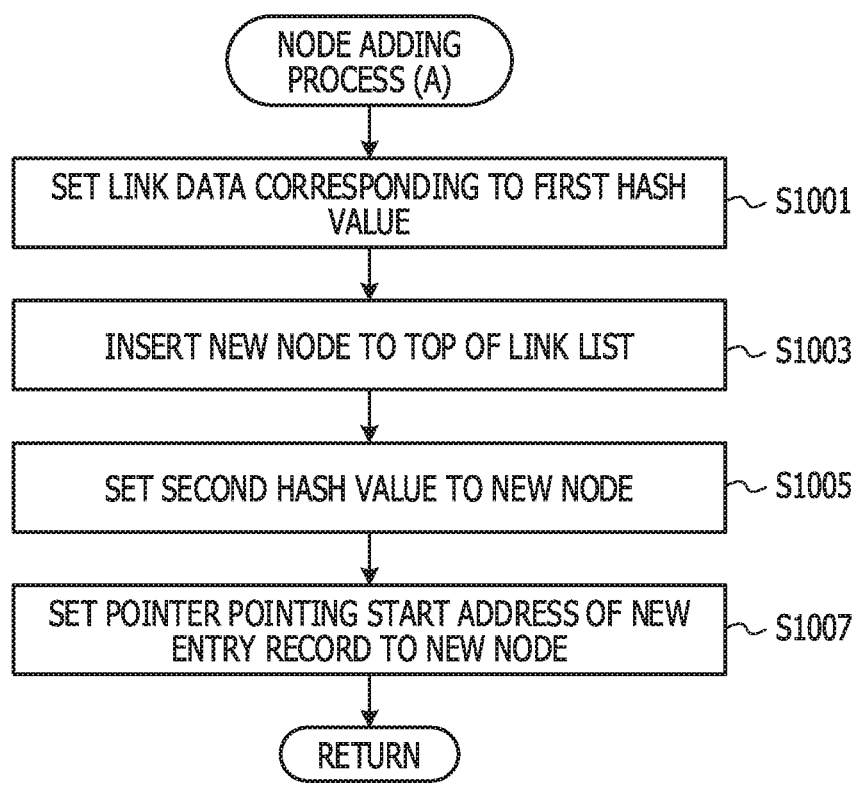
FIG. 10 is a diagram illustrating a flow of a node addition process (A)

FIG. 10 is a diagram illustrating a flow of node addition process (A). The addition unit 609 specifies link data corresponding to the first hash value calculated in S801 (S1001). The link data identifies the lead node of the link list for the cognate key associated with the first hash value.

The addition unit 609 inserts a new node before the lead node (S1003). For example, the link data specified in S1001 is set to the new node. Further, the link data corresponding to the first hash value is rewritten to link data for specifying a new node.

In this manner, the searching performance of the data storage device 100 is improved in terms of temporal locality. However, a new node may be added to a position other than the lead node. For example, a new node may be added to the end of the link list.

The addition unit 609 sets the second hash value calculated in S803 to the new node (S1005). The addition unit 609 sets, in the new node, a pointer pointing to the start address of the entry record set in S805 (S1007). When the node addition process (A) is finished, the process returns to the registration process (A) of the caller.

It returns to the illustration of FIG. 8. Finally, the answering unit 603 returns the processing result (S809). In a case where the above-described process is normally performed, success is returned as the processing result. However, for example, when a storage space is insufficient, a failure may be returned as a processing result. When the registration process (A) is ended, the process returns to the main process of the caller.

Figure 11A:
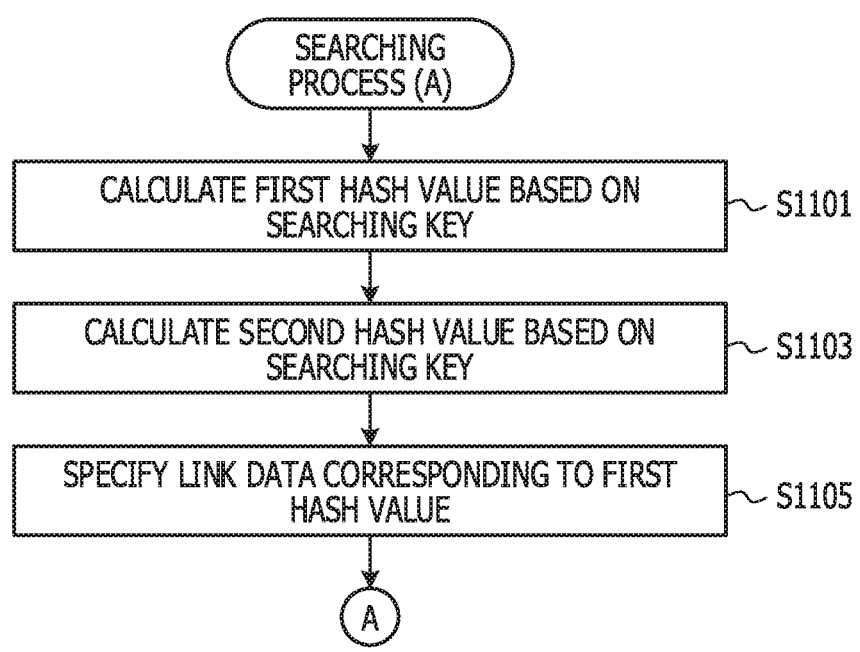
FIG. 11A is a diagram illustrating a flow of a searching process (A)
Figure 11B:
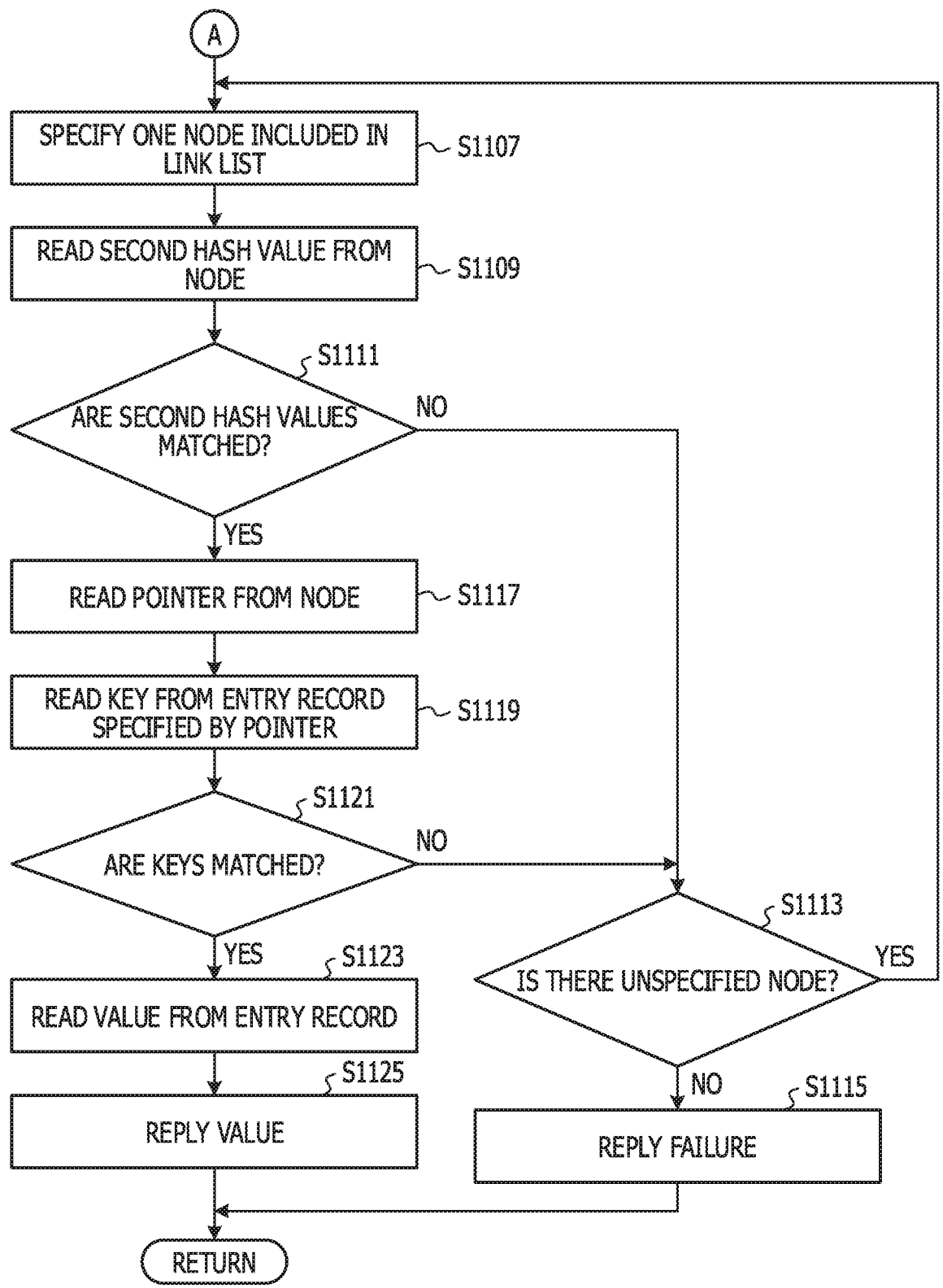
FIG. 11B is a diagram illustrating a flow of the searching process (A)

Subsequently, a searching process will be described. In the present embodiment, a searching process (A) is executed in S707. FIGS. 11A and 11B illustrate a flow of the searching process (A).

The first calculating unit 617 calculates the first hash value based on the searching key included in the searching request (S1101). The second calculating unit 619 calculates the second hash value based on the searching key included in the searching request (S1103). The search unit 613 specifies link data corresponding to the first hash value calculated in S1101 in the hash table (S1105). The process shifts to the process of S1107 illustrated in FIG. 11B via a terminal A.

The search unit 613 specifies one node included in the link list based on the link data (S1107). For example, the search unit 613 specifies the node in accordance with an order in which they are linked.

The search unit 613 reads the second hash value from the node (S1109), The search unit 613 determines whether the read second hash value matches the second hash value calculated in S1103 (S1111).

In a case where it is determined that the two second hash values do not match, the search unit 613 determines whether there is an unspecified node (S1113). For example, the search unit 613 determines whether there is a next node in accordance with the linked order. If the termination code is set to the node specified in S1107 instead of the link data, it is determined that there is no unspecified node.

If it is determined that there is no unspecified node, the answering unit 603 returns a failure as a processing result (S1115). The searching process (A) is ended, and the process returns to the main process of the caller.

On the other hand, in a case where it is determined that there is the unspecified node, the process returns to the process depicted in S1107, and the above-described processes are repeated.

The description returns to the process depicted in step S1111. In a case where it is determined that the read second hash value matches the second hash value calculated in S1103, the search unit 613 reads a pointer from the node specified in S1107 (S1117). Further, the search unit 613 reads the key from the entry record specified by the pointer (S1119). The search unit 613 determines whether the read key matches the search key included in the search request (S1121).

In a case where it is determined that the two keys do not match, the process proceeds to step S1113. On the other hand, in a case where it is determined that the two keys match, the acquisition unit 615 reads a value from the entry record specified in S1119 (S1123). The answering unit 603 returns the value (S1125). When the searching process (A) is ended, the process returns to the main process of the caller.

According to the present embodiment, in an apparatus that stores data by using a plurality of types of memory devices, handling of collision in the hash table may be quickened.

In addition, since the second hash value based on the key is used to cope with the collision, it is difficult to compress the space of the DRAM.

Embodiment 2

In this embodiment, an example in which a node corresponding to an entry record to be a reference target is brought up to the top of the link list will be described.

Figure 12A:
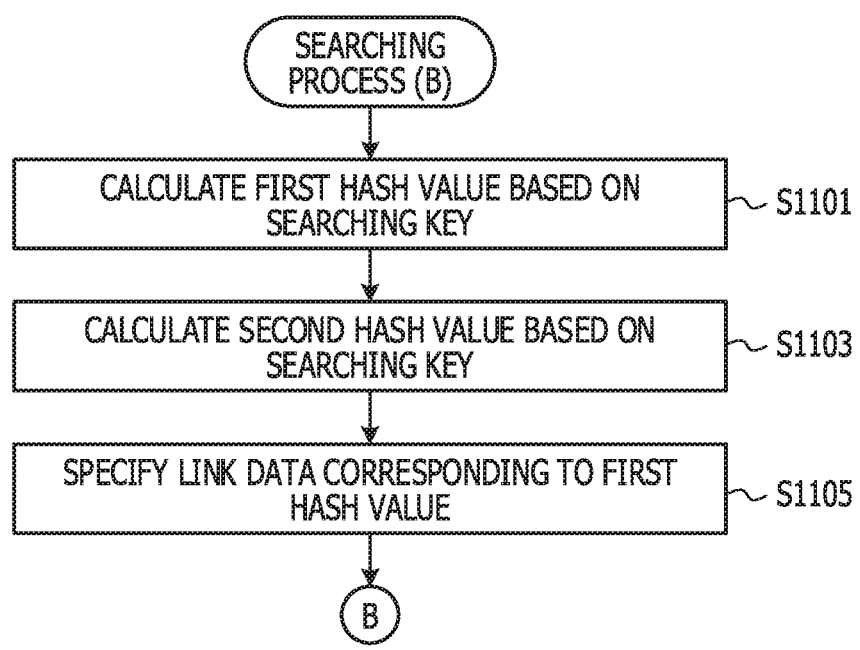
FIG. 12A is a diagram illustrating a flow of a searching process (B)
Figure 12B:
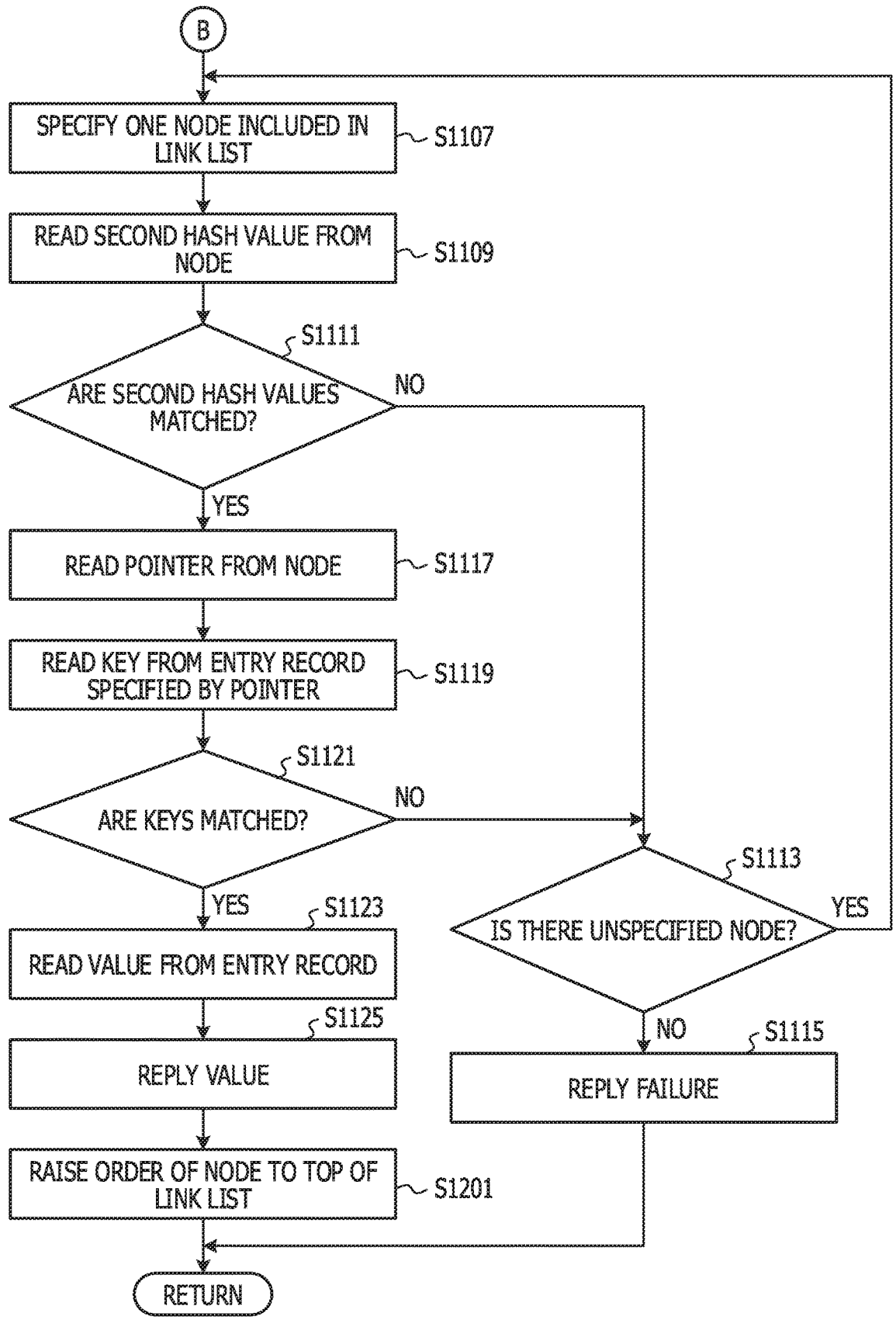
FIG. 12B is a diagram illustrating a flow of the searching process (B)

In the present embodiment, a searching process (B) is executed instead of the searching process (A). FIGS. 12A and 12B illustrate a flow of the searching process (B). The processes depicted in S1101 to S1125 are the same as in the cases of FIGS. 11A and 11B.

When the searched value is returned in S1125, the changing unit 621 raises the order of the node specified in S1107 to the top of the link list (S1201). For example, the link data corresponding to the first hash value is rewritten to the link data for specifying the node specified in S1107. Furthermore, the link data set in the node before the node specified in S1107 is rewritten to the link data for specifying the next node of the node specified in S1107.

The changing unit 621 may raise the order of the nodes specified in S1107 by a predetermined number.

The registration process is the same as in the case of Embodiment 1.

According to the present embodiment, from the viewpoint of temporal locality, the process of re-searching the searched value is faster.

Embodiment 3

In the present embodiment, in a case where the free space for providing the new entry record in the first entry storage unit 205 is insufficient, an example in which the entry record stored in the first entry storage unit 205 is transferred to the second entry storage unit 207 will be described.

In the present embodiment, an entry record setting process (B) is executed instead of the entry record setting process (A) based on Embodiment 1 or 2.

Figure 13:
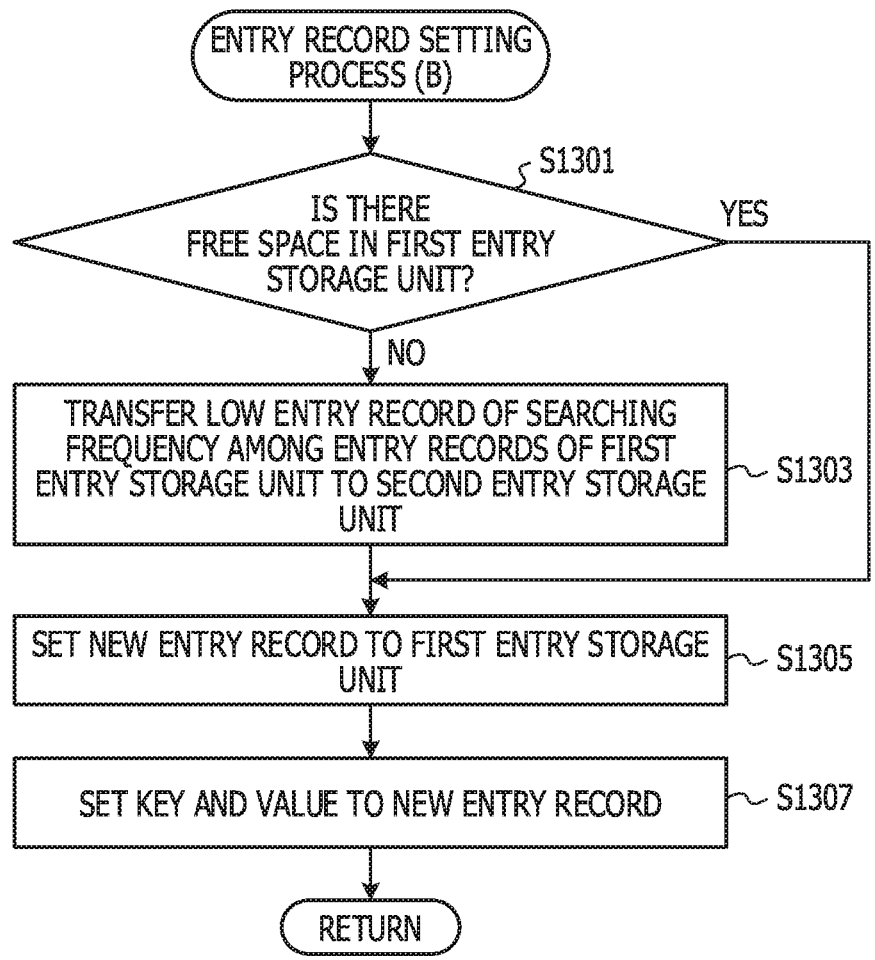
FIG. 13 is a diagram illustrating a flow of an entry record setting process (B)

FIG. 13 illustrates a flow of the entry record setting process (B). The setting unit 607 determines whether there is a free space for providing a new entry record in the first entry storage unit 205 (S1301). In a case where it is determined that there is a free space for providing the new entry record in the first entry storage unit 205, the setting unit 607 directly provides a new entry record in the first entry storage unit 205 (S1305).

On the other hand, when it is determined that there is no free space for providing a new entry record in the first entry storage unit 205, the moving unit 622 determines that a searching frequency of the entry records in the first entry storage unit 205 The lower entry record is moved to the second entry storage unit 207 (S1303). At this time, the link data in the node corresponding to the entry record is also updated. Next, the setting unit 607 sets a new entry record in the first entry storage unit 205 (S1305).

The setting unit 607 sets the key and the value included in the registration request in the new entry record (S1307). When the entry record setting process (B) is ended, the process returns to the registration process (A) of the caller.

The field of searching frequency may be provided in either a node or an entry record. In the searching process (A) or the searching process (B), the searching frequency of the entry record to be referred to is counted.

According to the present embodiment, from the viewpoint of temporal locality, the process in the case of searching for the value related to the recently registered entry is faster.

Embodiment 4

In the present embodiment, an example in which a third hash value is further used to cope with a collision related to the second hash value will be described.

Figure 14:
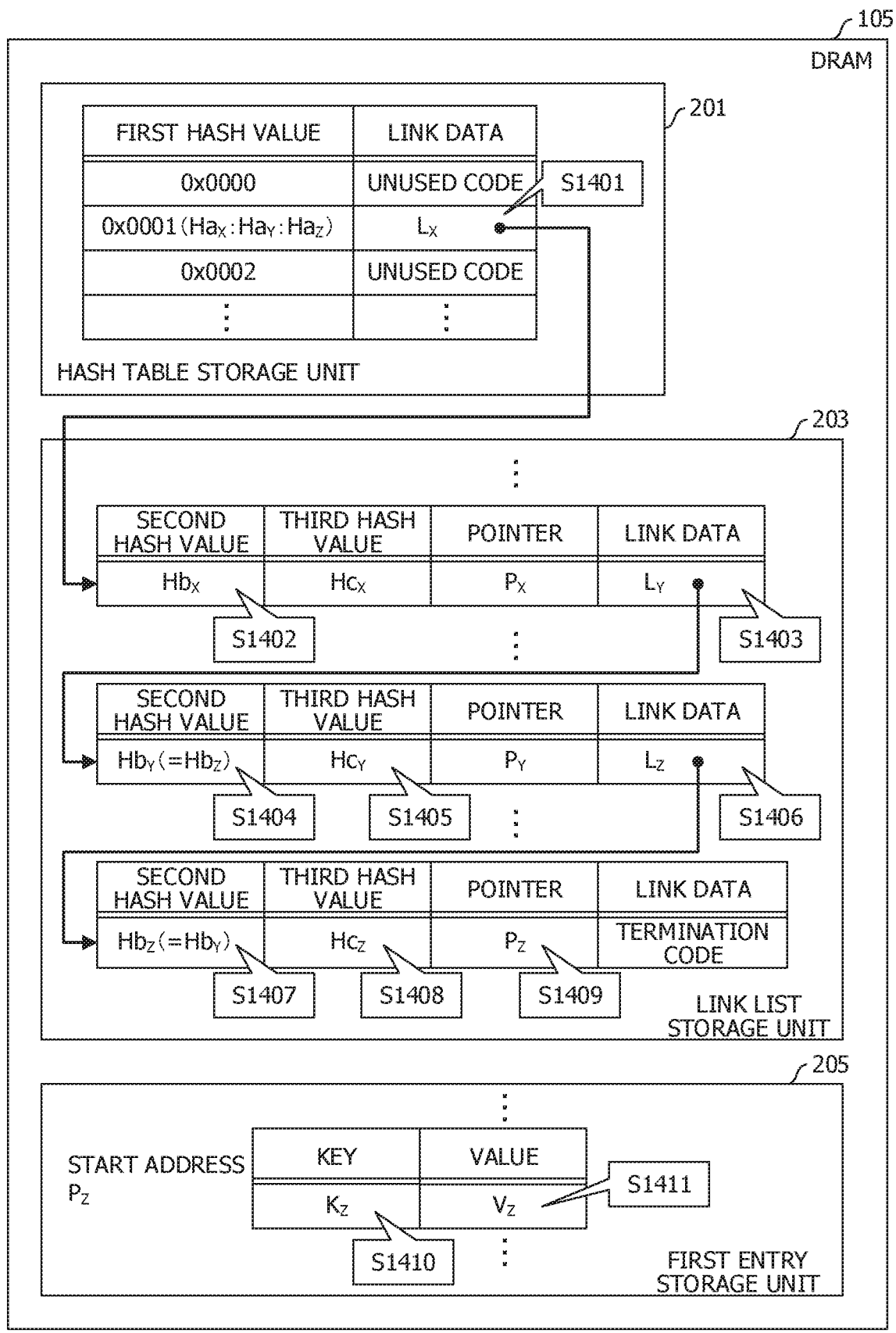
FIG. 14 is a diagram illustrating a data configuration in Embodiment 4.

FIG. 14 is a diagram illustrating a data configuration in Embodiment 4. The node in the link list of the present embodiment has a field for setting the third hash value, in addition to the fields in Embodiment 1. The third hash value is calculated based on the key in the same manner as the first hash value and the second hash value. However, the third hash value is calculated using a hash function different from the hash function for calculating the first hash value and the hash function for calculating the second hash value.

The third hash value is used to distinguish the keys when the cognate key for the first hash value is also cognate to the second hash value. In the following example, it is assumed that the key $K_Y$ and the key $K_Z$ are cognate to the first hash value and also to the second hash value. For example, the first hash value $Ha_Y$ and the first hash value $Ha_Z$ are equal to each other, and the second hash value $Hb_Y$ and the second hash value $Hb_Z$ are equal to each other.

The configurations of the hash table, the first entry storage unit 205, and the second entry storage unit 207 are the same as in the case of Embodiment 1.

Subsequently, an operation when the searching key included in the searching request is $K_Z$ will be described. Firstly, the link data $L_X$ corresponding to the hash value $Ha_Z$ (0x0001) of the searching key $K_Z$ is read (S1401). Furthermore, the second hash value $Hb_X$ set in the first node specified by the link data $L_X$ is read (S1402). Since the read second hash value $Hb_X$ does not match the second hash value $Hb_Z$ of the searching key $K_Z$, the node is irrelevant to the reference target.

Therefore, the link data $L_Y$ set in the first node is read (S1403). Further, the second hash value $Hb_Y$ set in the second node specified by the link data $L_Y$ is read (S1404). Since the read second hash value $Hb_Y$ matches the second hash value $Hb_Z$ of the searching key $K_Z$, the third hash value $Hc_Y$ set in the second node is read (S1405). However, since the read third hash value $Hc_Y$ does not match the third hash value $Hc_Z$ of the searching key $K_Z$, the node is irrelevant to the reference target.

Therefore, the link data $L_Z$ set in the second node is read (S1406). Further, the second hash value $Hb_Z$ set in the third node specified by the link data $L_Z$ is read (S1407). Since the read second hash value $Hb_Z$ matches the second hash value $Hb_Z$ of the searching key $K_Z$, the third hash value $Hc_Z$ set in the third node is read (S1408). Since the read third hash value $Hc_Z$ matches the third hash value $Hc_Z$ of the searching key $K_Z$, the entry record corresponding to the node is the reference target candidate.

In this case, the pointer $P_Z$ set in the third node is read (S1409). The key $K_Z$ set in the entry record of the first entry storage unit 205 specified by the pointer $P_Z$ is read (S1410). Since the read key $K_Z$ matches the searching key $K_Z$, the entry record is a reference target. The value $V_Z$ set in the entry record is read (S1411). The value $V_Z$ is the searching result.

Figure 15:
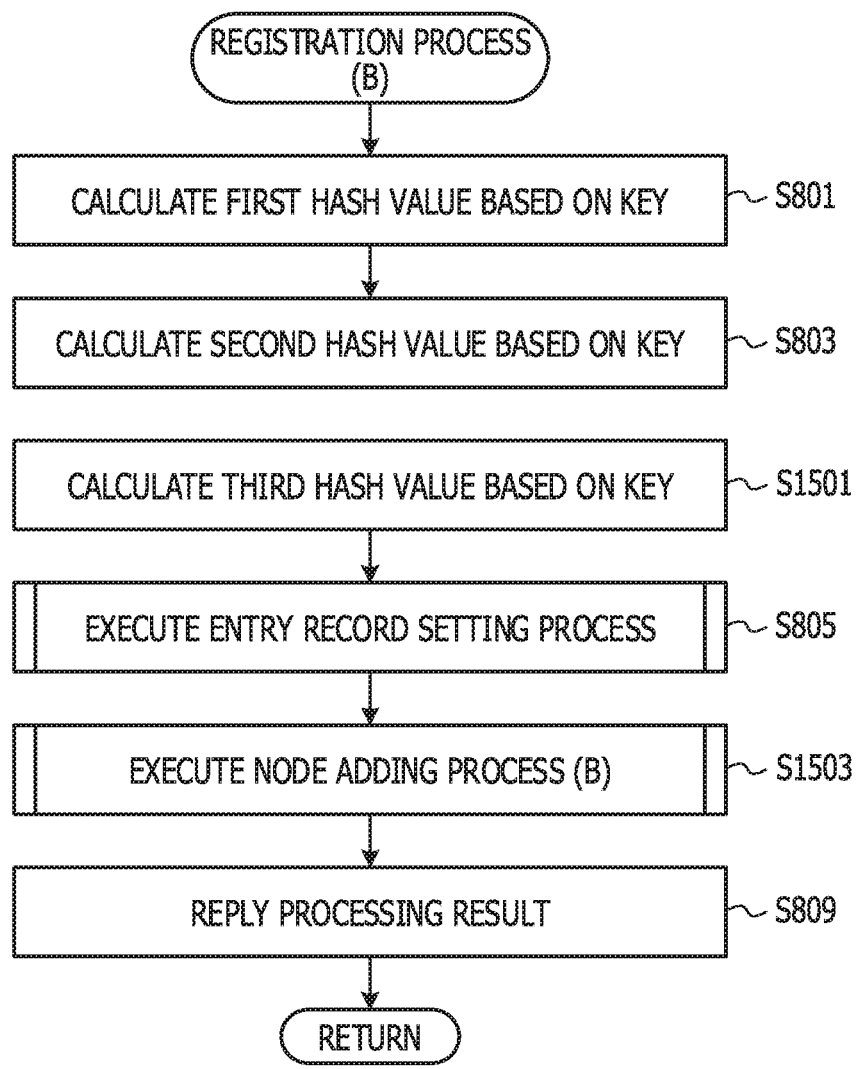
FIG. 15 is a diagram illustrating a flow of a registration process (B)

The process of the present embodiment will now be described. In the present embodiment, a registration process (B) is executed instead of the registration process (A). FIG. 15 illustrates a flow of the registration process (B).

The processes depicted in S801 and S803 are the same as in the case of FIG. 8. The third calculating unit 623 calculates the third hash value based on the key (31501).

The process depicted in S805 is the same as in the case of FIG. 8. The addition unit 609 executes a node addition process (B) instead of the node addition process (A) (S1503).

Figure 16:
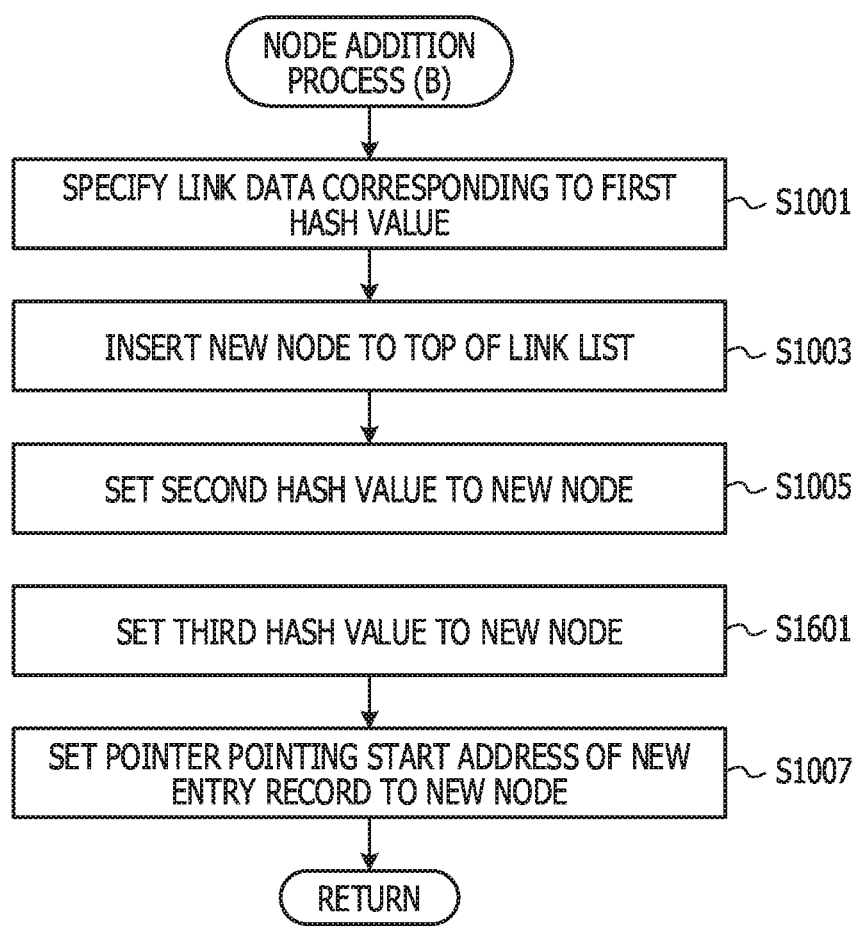
FIG. 16 is a diagram illustrating a flow of a node addition process (B)

FIG. 16 is a diagram illustrating a flow of a node addition process (B). The processes depicted in S1001 to S1005 are the same as in the case of FIG. 10. The addition unit 609 sets the third hash value in the new node (S1601).

The process depicted in S1007 is the same as in the case of FIG. 10. When the node addition process (B) is ended, the process returns to the registration processing (B) of the caller.

It returns to the illustration of FIG. 15. The process depicted in S809 is the same as in the case of FIG. 8.

Figure 17A:
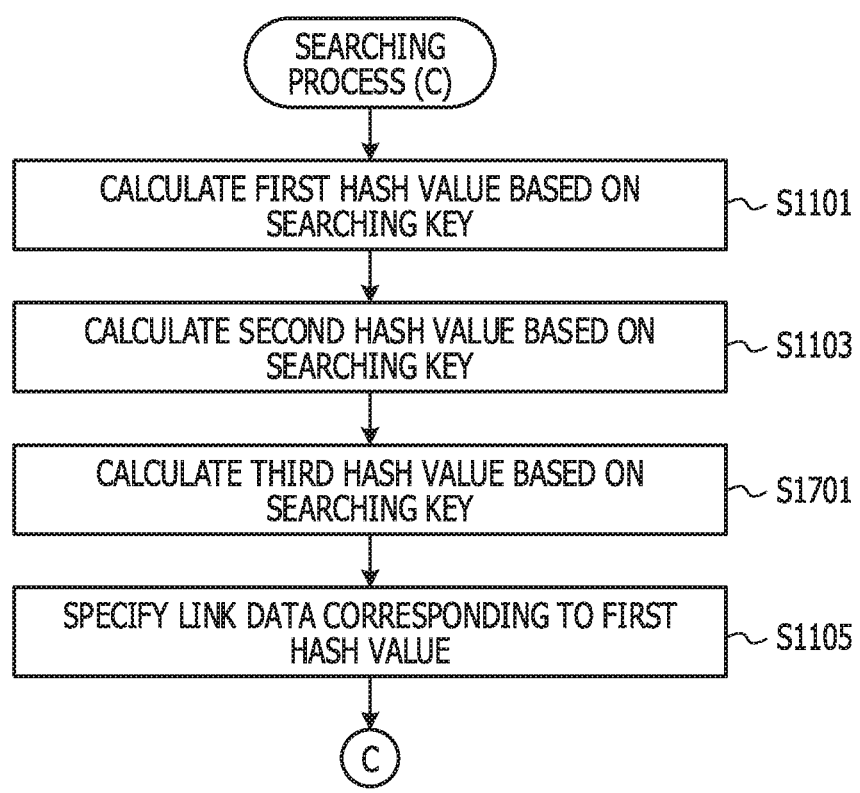
FIG. 17A is a diagram illustrating a flow of a searching process (C)
Figure 17B:
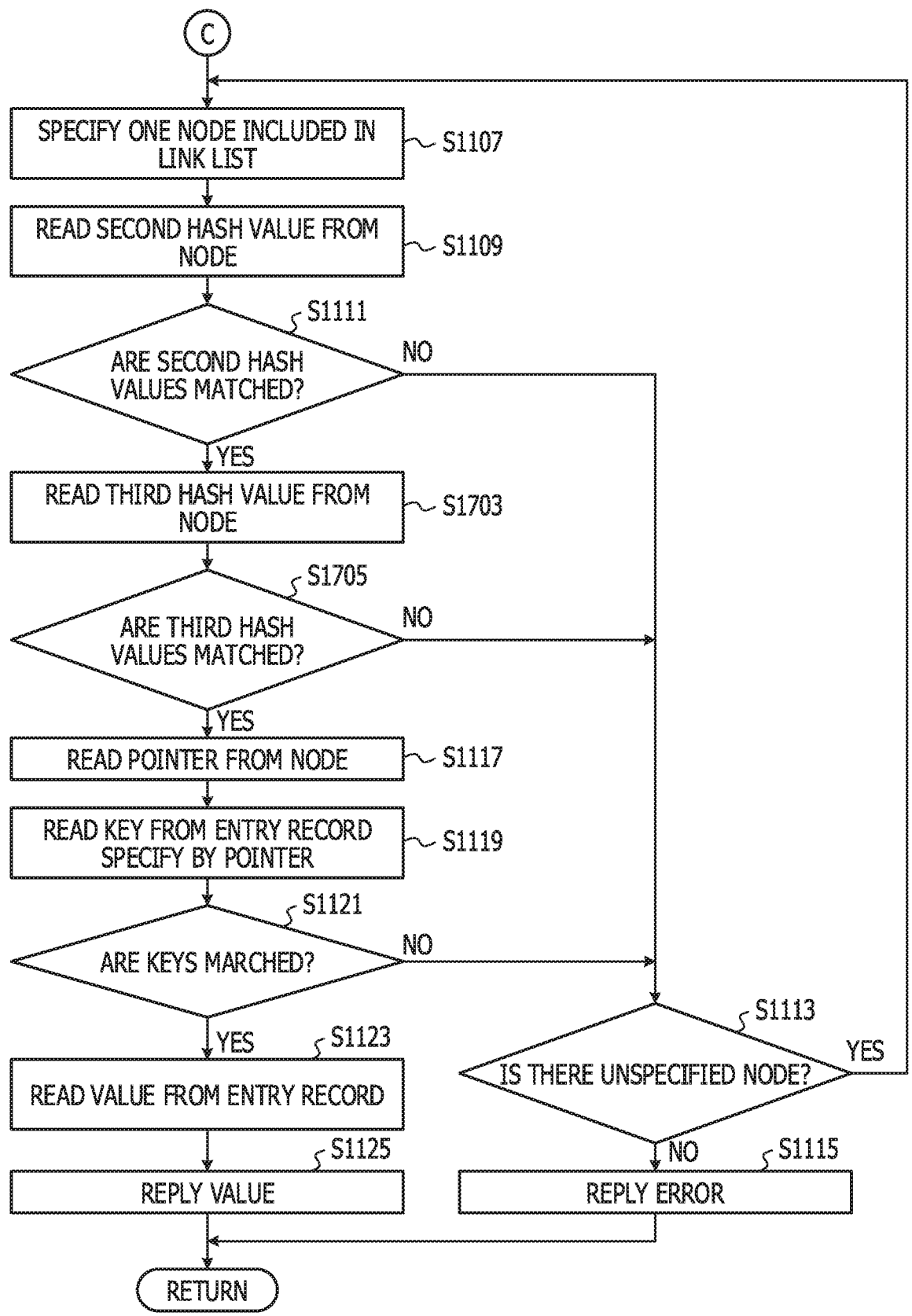
FIG. 17B is a diagram illustrating a flow of the searching process (C)

In addition, in the present embodiment, a searching process (C) is executed. FIGS. 17A and 17B are diagrams illustrating a flow of the searching process (C).

The processes depicted in S1101 and S1103 are the same as in the case of FIG. 11A. The third calculating unit 623 calculates the third hash value based on the searching key included in the searching request (S1701).

The processes depicted in S1105 to S1115 are the same as in the cases of FIGS. 11A and 11B. In a case where it is determined in S1111 that the two second hash values described above match, the search unit 613 reads the third hash value from the node (31703). The search unit 613 determines whether the read third hash value matches the third hash value calculated in S1701 (31705). In a case where it is determined that the two third hash values do not match, the process proceeds to the process depicted in S1113.

On the other hand, in a case where it is determined that the two third hash values match, the process proceeds to the process depicted in S1117.

The processes depicted in S1117 to S1125 are the same as in the case of FIG. 11B. When the searching process (C) is ended, the process returns to the main process of the caller.

According to the present embodiment, since there is no desire to read the key in a case where a collision related to the second hash value occurs, handling of the collision becomes faster.

Although the embodiment is described above, the present embodiment is not limited thereto. For example, the functional block configuration described above may not match the program module configuration.

Further, the configuration of each storage space described above is an example, and it not may be such as in the configuration described above. Furthermore, in the process flow, as long as the processing result does not change, the order of the process may be changed or a plurality of processes may be executed in parallel.

The data storage device 100 described above is a computer device, and as illustrated in FIG. 18, in the data storage device 100, a memory 2501, a CPU 2503, a hard disk drive (HDD) 2505, a display control unit 2507 connected to a display device 2509, a drive device 2513 for a removable disk 2511, an input device 2515, and a communication control unit 2517 for connecting to a network are connected via a bus 2519. An operating system (OS: Operating System) and an application program for performing the processes in the present embodiment are stored in the HDD 2505 and read from the HDD 2505 to the memory 2501 when the system and the program are executed by the CPU 2503. The CPU 2503 controls the display control unit 2507, the communication control unit 2517, and the drive device 2513 according to the processing content of the application program to perform a predetermined operation. Further, data in the middle of the process is mainly stored in the memory 2501. However, the data may be stored in the HDD 2505. In the embodiment, an application program for executing the above-described processes is stored and distributed in a computer readable removable disk 2511 and installed from the drive device 2513 into the HDD 2505. The program is installed in the HDD 2505 via a network such as the Internet and the communication control unit 2517 in some cases. Such a computer device realizes various functions as described above by organic cooperation between hardware such as the CPU 2503 and the memory 2501 described above and programs such as the OS and application programs.

The embodiments of the present disclosure described above are summarized as follows.

An information processing apparatus according to the present embodiment includes (A) an addition unit that adds, when storing an entry including a key and a value in a first memory device or a second memory device having a latency higher than that of the first memory device, a first identifier of the key, which is associated with the entry, to the list provided in the first memory device for each cognate key in a hash table using a first hash value and (B) an acquisition unit that acquires, in a case where the value is searched based on the searching key, the value from the entry associated with the first identifier of the searching key in the list related to the searching key and the cognate key.

In this manner, in an apparatus that stores data by using a plurality of types of memory devices, handling of collisions in the hash table may be quickened.

Furthermore, the first identifier may be the second hash value calculated by a hash function different from the hash function used to calculate the first hash value.

In this manner, since the second hash value is used, it is difficult to compress the space of the first memory device.

Furthermore, in a case where the value is searched based on the searching key, the changing unit may be provided to change the order of the first identifier of the searching key in the list upward.

In this way, in a view point of the temporal locality, the process of re-searching the searched value becomes faster.

Furthermore, in a case where there is not enough space for storing a new entry in the first memory device, a moving unit may be provided to move the entry stored in the first memory device to the second memory device.

In this manner, in the view point of the temporal locality, the process for searching the value related to the recently registered entry becomes faster.

Further, the addition unit may add the second identifier of the key to the list when adding the first identifier to the list. The acquisition unit may acquire the value from the entry associated with the first identifier of the searching key and the second identifier of the searching key in the list.

In this way, in a case where the collision occurs with the first identifier, the handling of the collision becomes faster.

Furthermore, the acquisition unit may determine whether the key included in the entry associated with the first identifier of the searching key matches the searching key.

In this way, the handling of the collision becomes more reliable.

A program for causing a computer to execute the process of the data storage device 100 described above may be created. The program may be stored in a computer-readable storage medium or a storage device such as a flexible disk, a CD-ROM, a magneto-optical disk, a semiconductor memory, and a hard disk. The intermediate processing results are generally temporarily stored in a storage device such as a main memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory including a first memory device and a second memory device, the second memory device being greater in latency than the first memory device, the first memory device being configured to store a plurality of lists each being associated with a respective hash value; and
a processor coupled to the memory, the processor being configured to execute a first process includes
receiving an entry that includes a key and a value,
in response to receiving the entry, storing the received entry in the second memory device,
in response to receiving the entry, selecting a first list from among the plurality of lists in accordance with a first hash value, the first hash value being derived from the key included in the received entry,
in response to selecting the first list, adding a set of a first identifier and a first pointer to the selected first list, the first identifier being derived from the key included in the received entry such that the first identifier is different from the first hash value, the first pointer directly indicating a memory location at which the received entry is stored or to be stored in the second memory device, each of the plurality of lists including neither the key nor the value included in the received entry even after adding the first identifier and the first pointer; and
execute a second process that includes
receiving a searching request for a value, the searching request includes a searching key,
in response to receiving the searching request, selecting the first list from among the plurality of lists in accordance with the first hash value derived from the searching key included in the received searching request,
obtaining, in accordance with a second identifier derived from the searching key included in the received searching request, the first identifier from the first list selected in the second process, the first identifier matching the second identifier,
obtaining, from the first list selected in the second process, the first pointer corresponding to the first identifier obtained in the second process,
obtaining the entry from the memory location directly indicated by the first identifier, and
outputting the value included in the entry obtained in the second process.

2. The information processing apparatus according to claim 1,
wherein the first identifier is a second hash value derived by using a second hash function different from a first hash function, the first hash function being used to calculate the first hash value.

3. The information processing apparatus according to claim 1,
wherein each of the plurality of lists is configured to store one or more of the first identifiers in an order, and
wherein the processor is configured to
execute a third process that includes in a case where the searching request is received, changing the order of the first identifier corresponding to the searching key upward in the first list selected in accordance with the first hash value derived from the searching key included in the searching request.

4. The information processing apparatus according to claim 1,
wherein the processor is configured to
execute a fourth process that includes
in a case where a space for storing a new entry is insufficient in the first memory device, transferring an entry stored in the first memory device to the second memory device.

5. The information processing apparatus according to claim 1,
wherein the first process is configured to further add the second identifier corresponding to the key to the first list when the first identifier is added to the first list, and
wherein the second process is configured to acquire the value from the entry associated with the first identifier corresponding to the searching key and the second identifier corresponding to the searching key in the first list.

6. The information processing apparatus according to claim 1,
wherein the second process is configured to determine whether the key included in the entry associated with the first identifier corresponding to the searching key matches the searching key.

7. A method for information processing in a memory that includes a first memory device and a second memory device, the second memory device being greater in latency than the first memory device, the first memory device being configured to store a plurality of lists each being associated with a respective hash value, the method comprising:
executing a first process includes
receiving an entry that includes a key and a value,
in response to receiving the entry, storing the received entry in the second memory device,
in response to receiving the entry, selecting a first list from among the plurality of lists in accordance with a first hash value, the first hash value being derived from the key included in the received entry,
in response to selecting the first list, adding a set of a first identifier and a first pointer to the selected first list, the first identifier being derived from the key included in the received entry such that the first identifier is different from the first hash value, the first pointer directly indicating a memory location at which the received entry is stored or to be stored in the second memory device, each of the plurality of lists including neither the key nor the value included in the received entry even after adding the first identifier and the first pointer;
and
executing a second process that includes
receiving a searching request for a value, the searching request includes a searching key,
in response to receiving the searching request, selecting the first list from among the plurality of lists in accordance with the first hash value derived from the searching key included in the received searching request,
obtaining, in accordance with a second identifier derived from the searching key included in the received searching request, the first identifier from the first list selected in the second process, the first identifier matching the second identifier,
obtaining, from the first list selected in the second process, the first pointer corresponding to the first identifier obtained in the second process,
obtaining the entry from the memory location directly indicated by the first identifier, and
outputting the value included in the entry obtained in the second process.

8. The method according to claim 7,
wherein the first identifier is a second hash value derived by using a second hash function different from a first hash function, the first hash function being used to calculate the first hash value.

9. The method according to claim 7,
wherein each of the plurality of lists is configured to store one or more of the first identifiers in an order, and
wherein the method further comprises:
executing a third process that includes
in a case where the searching request is received, changing the order of the first identifier corresponding to the searching key upward in the first list selected in accordance with the first hash value derived from the searching key included in the searching request.

10. The method according to claim 7, the method further comprising:
executing a fourth process that includes
in a case where a space for storing a new entry is insufficient in the first memory device, transferring an entry stored in the first memory device to the second memory device.

11. The method according to claim 7,
wherein the first process is configured to further add the second identifier corresponding to the key to the first list when the first identifier is added to the first list, and
wherein the second process is configured to acquire the value from the entry associated with the first identifier corresponding to the searching key and the second identifier corresponding to the searching key in the first list.

12. The method according to claim 7,
wherein the second process is configured to determine whether the key included in the entry associated with the first identifier corresponding to the searching key matches the searching key.

13. A non-transitory computer-readable storage medium storing a program which causes a processor to perform processing in a memory that includes a first memory device and a second memory device, the second memory device being greater in latency than the first memory device, the first memory device being configured to store a plurality of lists each being associated with a respective hash value, the processing comprising:
executing a first process includes
receiving an entry that includes a key and a value,
in response to receiving the entry, storing the received entry in the second memory device,
in response to receiving the entry, selecting a first list from among the plurality of lists in accordance with a first hash value, the first hash value being derived from the key included in the received entry,
in response to selecting the first list, adding a set of a first identifier and a first pointer to the selected first list, the first identifier being derived from the key included in the received entry such that the first identifier is different from the first hash value, the first pointer directly indicating a memory location at which the received entry is stored or to be stored in the second memory device, each of the plurality of lists including neither the key nor the value included in the received entry even after the adding of the first identifier and the first pointer;

and executing a second process that includes receiving a searching request for a value, the searching request includes a searching key, in response to receiving the searching request, selecting the first list from among the plurality of lists in accordance with the first hash value derived from the searching key included in the received searching request, obtaining, in accordance with a second identifier derived from the searching key included in the received searching request, the first identifier from the first list selected in the second process, the first identifier matching the second identifier, obtaining, from the first list selected in the second process, the first pointer corresponding to the first identifier obtained in the second process, obtaining the entry from the memory location directly indicated by the first identifier, and outputting the value included in the entry obtained in the second process.

14. The non-transitory computer-readable storage medium according to claim 13, wherein the first identifier is a second hash value derived by using a second hash function different from a first hash function, the first hash function being used to calculate the first hash value.

15. The non-transitory computer-readable storage medium according to claim 13, wherein each of the plurality of lists is configured to store one or more of the first identifiers in an order, and wherein the processing further comprises:

executing a third process that includes in a case where the searching request is received, changing the order of the first identifier corresponding to the searching key upward in the first list selected in accordance with the first hash value derived from the searching key included in the searching request.

16. The non-transitory computer-readable storage medium according to claim 13, the processing further comprising:

executing a fourth process that includes in a case where a space for storing a new entry is insufficient in the first memory device, transferring an entry stored in the first memory device to the second memory device.

17. The non-transitory computer-readable storage medium according to claim 13, wherein the first process is configured to further add the second identifier corresponding to the key to the first list when the first identifier is added to the first list, and wherein the second process is configured to acquire the value from the entry associated with the first identifier corresponding to the searching key and the second identifier corresponding to the searching key in the first list.

18. The non-transitory computer-readable storage medium according to claim 13, wherein the second process is configured to determine whether the key included in the entry associated with the first identifier corresponding to the searching key matches the searching key.

* * * * *